US012296788B2

(12) United States Patent
Tyler et al.

(10) Patent No.: US 12,296,788 B2
(45) Date of Patent: May 13, 2025

(54) DEVICE, SYSTEM, AND METHOD FOR DETERMINING A LOCATION OF A VEHICLE

(71) Applicant: Jonathan A. Tyler, Ashuelot, NH (US)

(72) Inventors: Jonathan A. Tyler, Ashuelot, NH (US); Matteo Karim Carlo Edmondo Borri, San Rafael, CA (US); Kenneth Allan Tarlow, San Rafael, CA (US)

(73) Assignee: Jonathan A. Tyler, Ashuelot, NH (US)

( * ) Notice: Subject to any disclaimer, the term of this patent is extended or adjusted under 35 U.S.C. 154(b) by 876 days.

(21) Appl. No.: 17/506,479

(22) Filed: Oct. 20, 2021

(65) Prior Publication Data

US 2022/0041135 A1   Feb. 10, 2022

Related U.S. Application Data

(63) Continuation-in-part of application No. 17/072,455, filed on Oct. 16, 2020, now Pat. No. 11,815,610.

(60) Provisional application No. 62/964,419, filed on Jan. 22, 2020, provisional application No. 62/924,176, filed on Oct. 22, 2019, provisional application No. 62/916,212, filed on Oct. 16, 2019.

(51) Int. Cl.
*B60R 25/33* (2013.01)
*G01S 19/51* (2010.01)
*G08B 5/36* (2006.01)

(52) U.S. Cl.
CPC ................ *B60R 25/33* (2013.01); *G08B 5/36* (2013.01); *G01S 19/51* (2013.01)

(58) Field of Classification Search
CPC ............ G01S 19/51; B60R 25/33; G08B 5/36
USPC ............ 701/208, 213, 300, 408; 340/539.13
See application file for complete search history.

(56) References Cited

U.S. PATENT DOCUMENTS

| 7,950,539 B2 * | 5/2011 | Henriksson ........... B66C 13/063 212/270 |
| 8,396,656 B1 * | 3/2013 | Karmel ................ G01C 21/203 701/408 |

* cited by examiner

*Primary Examiner* — Bo Fan
(74) *Attorney, Agent, or Firm* — Lucas & Mercanti, LLP; Jonathan A. Tyler

(57) ABSTRACT

A locator device includes a housing, a plurality of directional indicators, a first button, a second button, a memory, and a GPS device. The device also includes a processor adapted to determine that the first button has been pressed, and, in response, obtain from the GPS device first location data representing a first location of the device, and store the first location data in the memory. The processor is further adapted to determine that the second button has been pressed, and in response, retrieve the first location data from the memory, obtain from the GPS device second location data representing a second location of the device, determine a direction from the second location to the first location, identify a directional indicator corresponding to the direction, and illuminate the identified directional indicator to indicate the direction.

8 Claims, 27 Drawing Sheets

835

| 1054 | 1056 | |
|---|---|---|
| North | 15 Ft | 1061 |
| Northeast | 33 Ft | 1062 |
| East | 22 Ft | 1063 |
| South | 35 Ft | 1064 |
| East | 12 Ft | 1065 |

FIG. 10B

DEVICE, SYSTEM, AND METHOD FOR DETERMINING A LOCATION OF A VEHICLE

CROSS REFERENCE TO RELATED APPLICATION

This application is a continuation-in-part of U.S. application Ser. No. 17/072,455 filed Oct. 16, 2020, which claimed priority from U.S. Provisional Application No. 62/916,212 filed Oct. 16, 2019 and from U.S. Provisional Application No. 62/924,176 filed Oct. 22, 2019 and from U.S. Provisional Application No. 62/964,419 filed Jan. 22, 2020, the contents of which are incorporated herein by reference.

TECHNICAL FIELD

This specification relates generally to electronic devices, and more particularly to electronic devices adapted to locate a particular object or location.

BACKGROUND

A minor but frequent annoyance that many people experience on a regular basis is the frustration of being unable to find their car upon leaving a store, mall, office building, or other building or locale. As almost everyone knows, this happens most frequently in large parking lots where the car is parked far from the exit of a building. Most people finding themselves in this situation simply rely on their own memory to find their car; however, because human memory is unreliable, a person unable to recall where their car is parked often ends up walking in the wrong direction or simply wandering around the parking lot hoping to stumble across their car. Unfortunately, no devices are available that solve this problem in a satisfactory manner. While software is available on cell phones that can assist a person in finding a vehicle, using a cell phone for this purpose is not always satisfactory for the simple reason that because people do not always carry their cell phones with them into a store, mall, or other building.

SUMMARY

In accordance with an embodiment, an apparatus includes a housing adapted to be carried in a hand of a user, a GPS device adapted to determine a location of the apparatus, a memory adapted to store data, a plurality of lighting elements disposed in a circular pattern in the housing and first and second buttons. The apparatus also includes a processor adapted to determine that the first button has been selected, and, in response to determining that the first button has been selected, perform operations including: causing the GPS device to determine a first location of the apparatus, and storing data representing the first position in the memory. The processor is also adapted to determine that the second button has been selected, and, in response to determining that the second button has been selected, perform operations including: retrieving from the memory the data representing the first location, causing the GPS device to determine a second position of the apparatus, determining a direction from the second location to the first location, identifying, from among the plurality of lighting elements, a lighting element that corresponds to the direction, and activating the identified lighting element.

In accordance with another embodiment, a locator device includes a housing formed from acrylonitrile butadiene styrene, the housing forming a first portion of an external surface of the device, a membrane formed of a polycarbonate resin thermoplastic, the membrane forming a second portion of the external surface of the device, the membrane having an outer surface, the membrane being one of transparent and translucent, and a plurality of directional indicators each adapted to display a selected direction, wherein each of the plurality of directional indicators is disposed below the outer surface of the membrane and is in contact with the membrane, each directional indicator comprising a light-emitting diode (LED), wherein each of the plurality of directional indicators, when illuminated, is visible through the outer surface of the membrane. The device also includes a first button comprising a first pressure sensor adapted to detect when a user presses the first button, the first button being disposed below the outer surface of the membrane and in contact with the membrane, and a second button comprising a second pressure sensor adapted to detect when a user presses the second button, the first button being disposed below the outer surface of the membrane and in contact with the membrane. The device also includes a printed circuit board (PCB) that includes a memory adapted to store data, a GPS device adapted to generate information representing a location of the device, a compass adapted to generate direction information, and a processor adapted to: determine that the first button has been pressed, in response to determining that the first button has been pressed, obtain from the GPS device first location data representing a first location and store the first location data in the memory, determine that the second button has been pressed, in response to determining that the second button has been pressed, retrieve the first location data from the memory, obtain from the GPS device second location data representing a second location, determine a direction from the second location to the first location, based on direction information generated by the compass, identify one of the plurality of directional indicators that corresponds to the direction, and illuminate the identified directional indicator to indicate the direction. The membrane may have an inner surface, and the plurality of directional indicators may be underwritten on the inner surface of the membrane or disposed within the membrane.

In accordance with another embodiment, a locator system includes a first device adapted to determine a first location of the first device, and transmit a signal including information representing the first location. The system also includes a second device that includes a receiver adapted to receive one or more signals, a memory comprising a selected memory location, a plurality of directional indicators, and a processor. The processor is adapted to receive the signal, determine the first location based on the signal, store information related to the first location in the selected memory location, determine a second location of the second device, determine a direction from the first device to the second device based on the first and second locations, and activate a selected directional indicator indicating the direction from the first device to the second device.

In accordance with another embodiment, a device includes a memory location adapted to store data, a GPS device adapted to generate information representing a location of the device, a motion detector adapted to determine when the device experiences a predetermined movement, and one or more directional indicators adapted to display a selected direction. The device also includes a processor adapted to perform the following first steps: obtain from the GPS device first location data representing a first location, and store the first location data in the memory location. The processor is further adapted to perform the following second steps in response to a determination that the device has experienced the predetermined movement: retrieve the first location data from the memory location, obtain from the GPS device second location data representing a second location, determine a direction from the second location to the first location, and cause the one or more directional indicators to indicate the direction.

In one embodiment, the predetermined movement occurs when the device is turned over from a face up position to a face down position.

In another embodiment, the one or more directional indicators include a plurality of lighting elements, or a needle adapted to rotate to indicate a selected direction.

In another embodiment, the device includes a compass adapted to generate direction data. Determining a direction from the second location to the first location includes obtaining direction data from the compass.

In another embodiment, the processor is further adapted to perform the first steps in response to an action performed by a user. For example, the action performed by the user may include moving a switch from a first position to a second position, moving the device in a predetermined manner, or pressing a button.

In accordance with another embodiment, a system includes a first device adapted to transmit a signal, and a second device that includes a receiver adapted to receive the signal, a memory comprising a selected memory location, and one or more directional indicators. The second device also includes a processor adapted to receive the signal at a first time, and in response to receiving the signal, determine a first location of the second device, and store information related to the first location in the selected memory location. The processor is further adapted to, at a second time subsequent to the first time: retrieve from the selected memory location data indicating the first location, determine a second location of the second device, determine a direction from the second location to the first location, and cause the one or more directional indicators to indicate the direction from the second location to the first location. The second time may occur when the user presses a button, for example, or when another predetermined event occurs.

In one embodiment, the first device is further adapted to transmit the signal periodically.

In another embodiment, the second device includes a GPS device adapted to generate location information. The processor is further adapted to determine the first location of the second device based on the location information generated by the GPS device.

In another embodiment, the signal includes the first location of the second device.

These and other aspects of the present Invention will be more fully understood by reference to one of the following drawings.

BRIEF DESCRIPTION OF THE DRAWINGS

FIG. 10B shows a movement database in accordance with an embodiment;

DETAILED DESCRIPTION

Figure 1A:
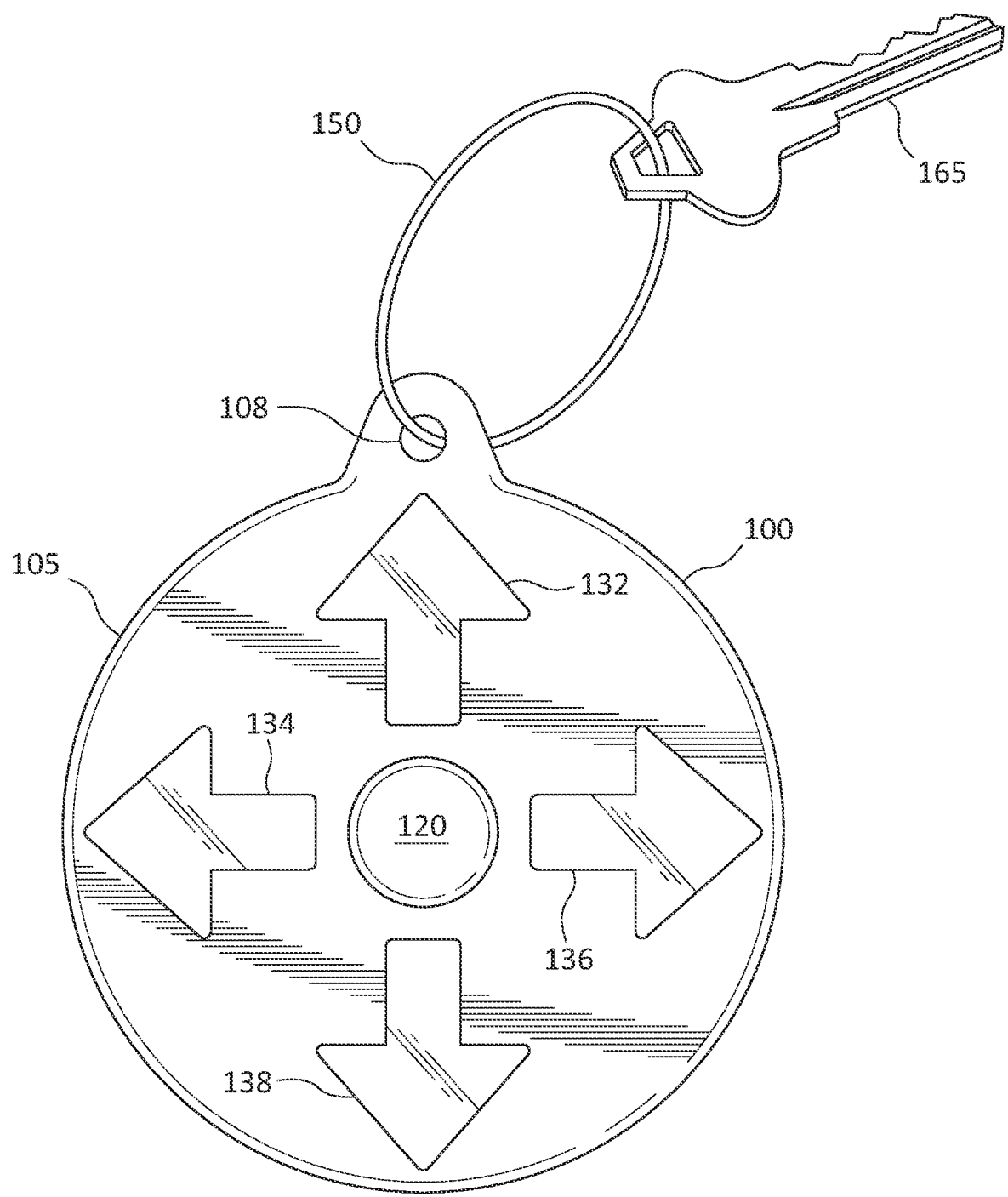
FIG. 1A shows a car locator device in accordance with an embodiment.

Systems, devices, and methods for locating and object or s location are described herein. Many illustrative embodiments and examples are described herein in the context of a user employing the systems, devices, and methods to locate a car or other vehicle. However, these illustrative embodiments and examples are not to be construed as limiting. In other embodiments, the systems, devices, and methods described herein may be used to locate other types of objects or to locate a desired location.

In accordance with an embodiment, a car locator device includes a memory location adapted to store data, a GPS device adapted to generate information representing a location of the device, a motion detector adapted to determine when the device experiences a predetermined movement, and one or more directional indicators adapted to display a selected direction. The device also includes a processor adapted to perform the following first steps: obtain from the GPS device first location data representing a first location, and store the first location data in the memory location. The processor is further adapted to perform the following second steps in response to a determination that the device has experienced the predetermined movement: retrieve the first location data from the memory location, obtain from the GPS device second location data representing a second location, determine a direction from the second location to the first location, and cause the one or more directional indicators to indicate the direction.

In one embodiment, the car locator device is not a cellular telephone and does not include cellular communication technology. Thus, the device cannot connect to a cellular network.

The predetermined movement may occur when the device is turned over from a face up position to a face down position, for example. The one or more directional indicators may include a plurality of lighting elements, or a needle adapted to rotate to indicate a selected direction.

In accordance with another embodiment, a car locator system includes a first device adapted to transmit a signal, and a second device that includes a receiver adapted to receive the signal, a memory comprising a selected memory location, and one or more directional indicators. The second device also includes a processor adapted to receive the signal at a first time, and in response to receiving the signal, determine a first location of the second device, and store information related to the first location in the selected memory location. The processor is further adapted to, at a second time subsequent to the first time: retrieve from the selected memory location data indicating the first location, determine a second location of the second device, determine a direction from the second location to the first location, and cause the one or more directional indicators to indicate the direction from the second location to the first location.

In accordance with an embodiment, a vehicle finder system includes a car locator device and a transmitting device. The car locator device fits on a ring of a key chain. The transmitting device fits in a selected area of a car, such as the central console, the glove compartment, in a pocket, under a seat, etc.

In various embodiments, a car locator device has a body having a fastening mechanism that allows the device to be connected to a key chain. For example, the car locator device may have a hole adapted to be engaged with a ring of a keychain. Alternatively, a car locator device may include a hook, a fastener, a clip, etc., adapted to be connected to a ring of a keychain. The body of the car locator device may include a button and one or more directional indicators. When the button is pushed, one of the one or more directional indicators (or a portion of a directional indicator) is illuminated to indicate a direction to a vehicle.

FIG. 1A shows a car locator device in accordance with an embodiment. Car locator device 100 includes a body 105, and a hole 108 adapted to engage with a ring, thereby allowing the device to be connected to a keychain. Car locator device 100 also includes a button 120 and a plurality of directional indicators 132, 134, 136, 138. In the illustrative embodiment of FIG. 1A, each directional indicator has an arrow shape. Each directional indicator may be a lighting element adapted to be selectively illuminated. While in the illustrative embodiment of FIG. 1A, car locator device 100 includes four directional indicators 132, 134, 136, and 138, in other embodiments, a car locator device may have more or fewer than four directional indicators. In other embodiments, a directional indicator may not have an arrow shape but may have a different shape.

In the illustrative embodiment of FIG. 1A, car locator device 100 fits on a key ring 150. For illustrative purposes, key ring 150 also holds a key 165.

Figure 1B:
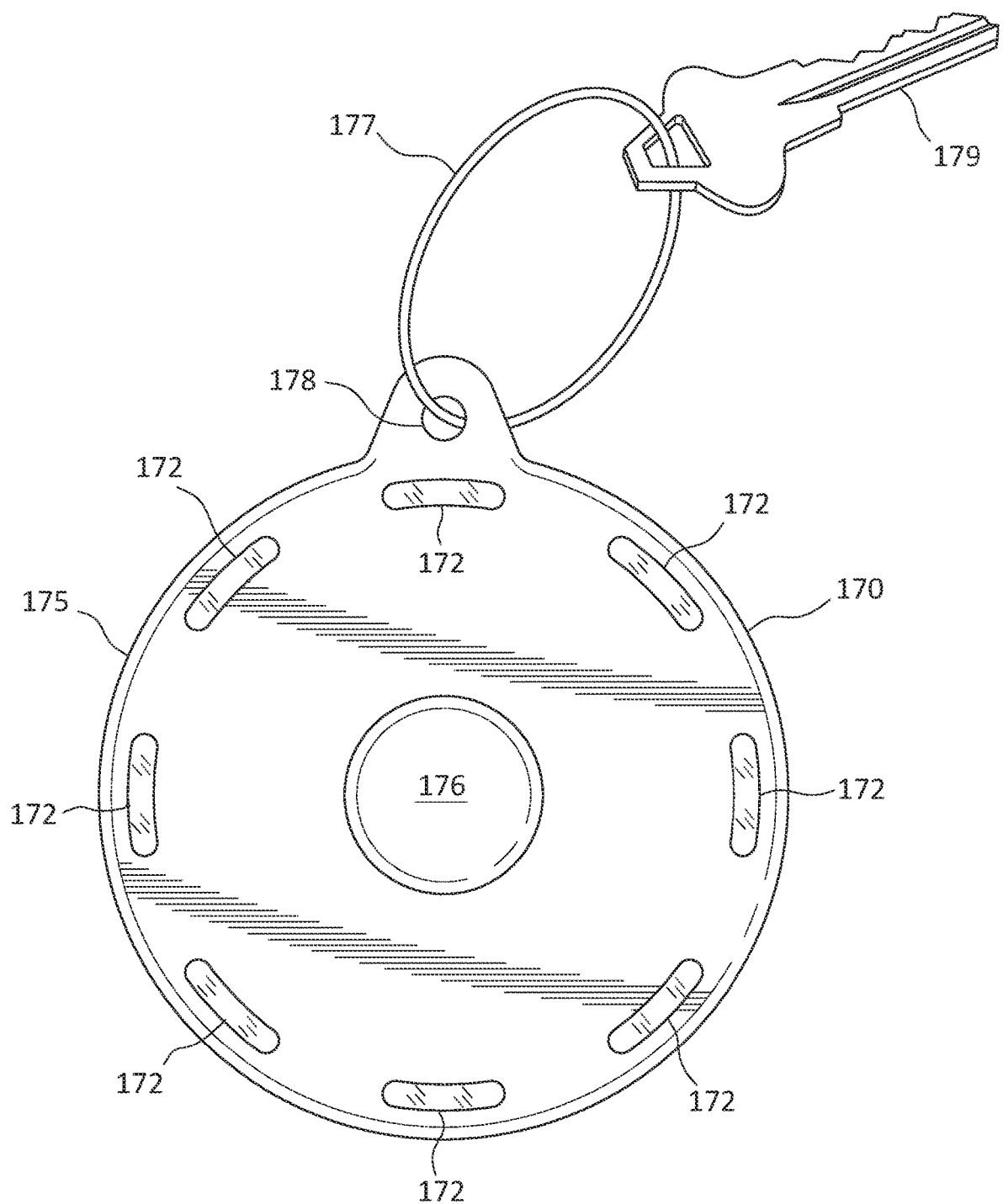
FIG. 1B shows a car locator device in accordance with another embodiment.

FIG. 1B shows a car locator device in accordance with another embodiment. Car locator device 170 includes a body 175, and a hole 178 adapted to engage with a ring, thereby allowing the device to be connected to a keychain. Car locator device 170 also includes a button 176 and a plurality of directional indicators 172. Each directional indicator may be a lighting element adapted to be selectively illuminated. Car locator device 170 includes eight directional indicators 172 arranged around the periphery of the device. Directional indicators 172 are spaced evenly around the periphery of the device. Directional indicators 172 are rectangularly-shaped or oval shaped. While in the illustrative embodiment of FIG. 1B, car locator device 170 includes eight directional indicators, in other embodiments, a car locator device may have more or fewer than eight directional indicators. In other embodiments, a directional indicator may have a different shape.

In the illustrative embodiment of FIG. 1B, car locator device 170 fits on a key ring 177. For illustrative purposes, key ring 177 also holds a key 179.

Figure 1C:
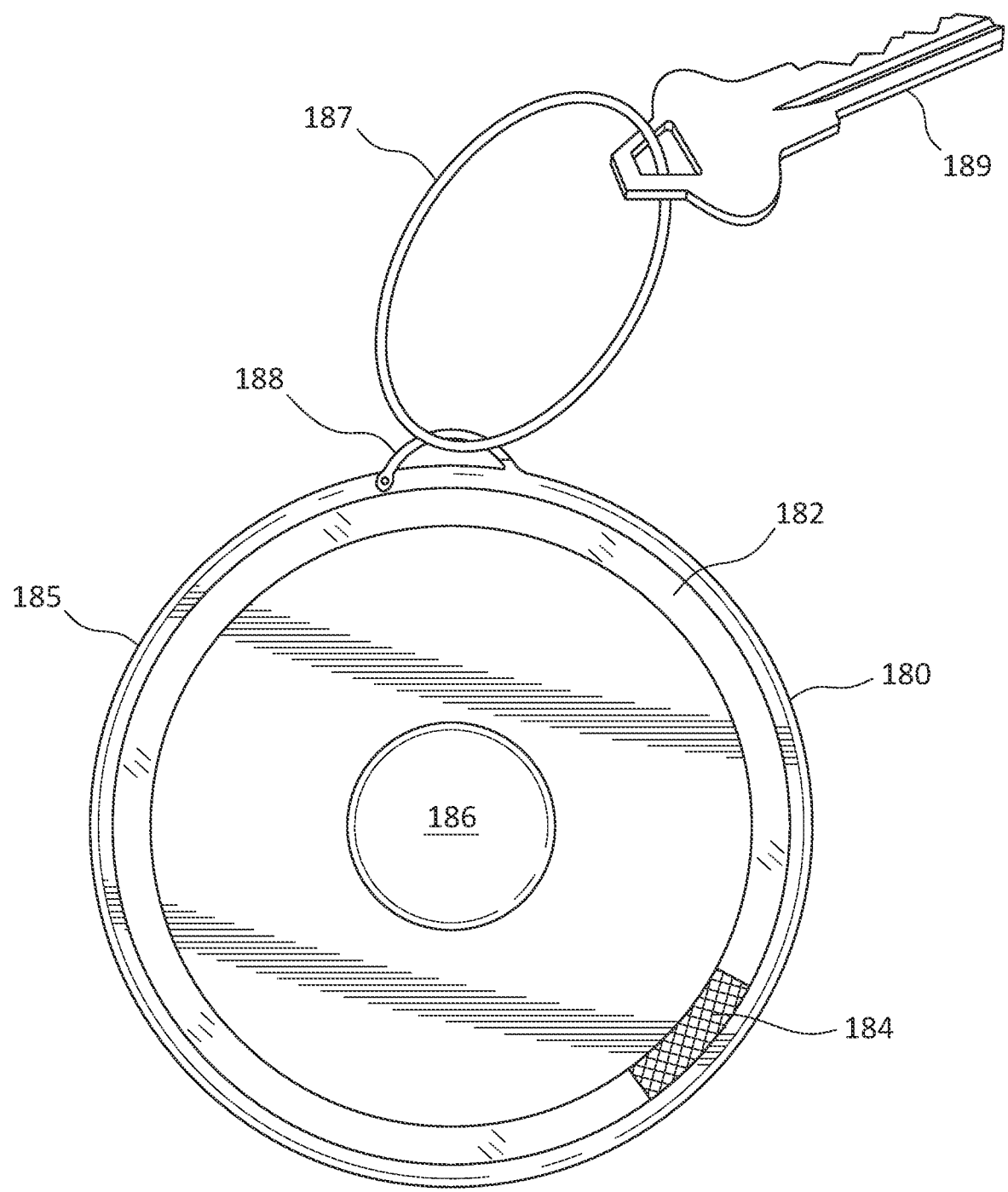
FIG. 1C shows a car locator device in accordance with another embodiment.

FIG. 1C shows a car locator device in accordance with another embodiment. Car locator device 180 includes a body 185, and a fastener 188 adapted to engage with a ring, thereby allowing the device to be connected to a keychain. Car locator device 180 also includes a button 186 and a single directional indicators 182 which extends around the entire periphery of the device. Directional indicator 182 may be, for example, a continuous lighting element adapted to be illuminated only in a selected section. A particular section within directional indicator 182 may be illuminated to indicate a selected direction. In the illustrative example of FIG. 1C, a section 184 is illuminated.

In the illustrative embodiment of FIG. 1C, car locator device 180 fits on a key ring 187. For illustrative purposes, key ring 187 also holds a key 189.

In other embodiments, a car locator device may be configured differently. For example, a car locator device may include a button disposed at any location on the device (on the front or back side, or on a side or edge). A car locator device may have one or more directional indicators placed at any location of the device. For example, directional indicators may be placed on the front or back side, on a side, or on an edge of the device.

Figure 2A:
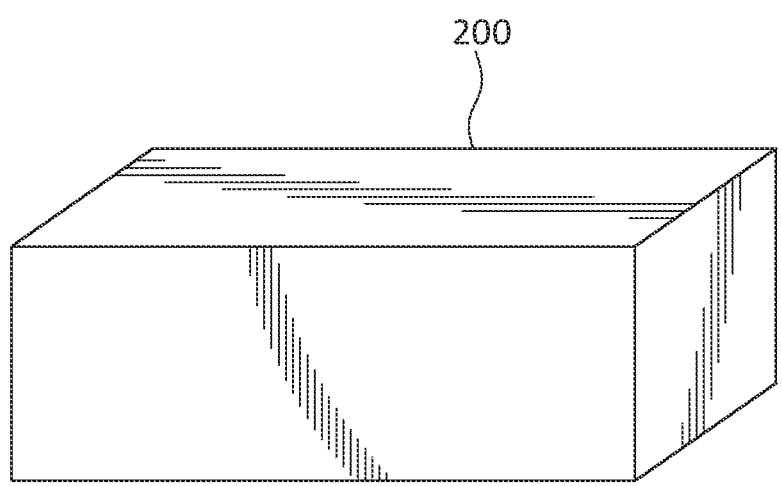
FIG. 2A shows a transmitting device in accordance with an embodiment.

In accordance with an embodiment, a transmitting device is a mobile device that may be easily placed by a user in a selected location, for example, at a desired location in the interior of a vehicle. FIG. 2A shows a transmitting device in accordance with an embodiment. Transmitting device 200 may fit into a convenient location in a user's car, such as in the central console, in the glove compartment, in a pocket, under a seat, etc. Transmitting device may be of any size or shape. In an illustrative embodiment, the dimensions of transmitting device 200 may be, for example, between 0.5 and 2 inches long, between 0.5 and 2 inches wide, and between 0.5 and 2 inches in height. While in the illustrative embodiment of FIG. 2A, transmitting device 200 has a rectangular prism shape, in other embodiments, a transmitting device may have other shapes and sizes. For example, a transmitting device may have a square shape, a tubular shape, a spherical shape, a cylindrical shape, a triangular shape, etc.

Figure 2B:
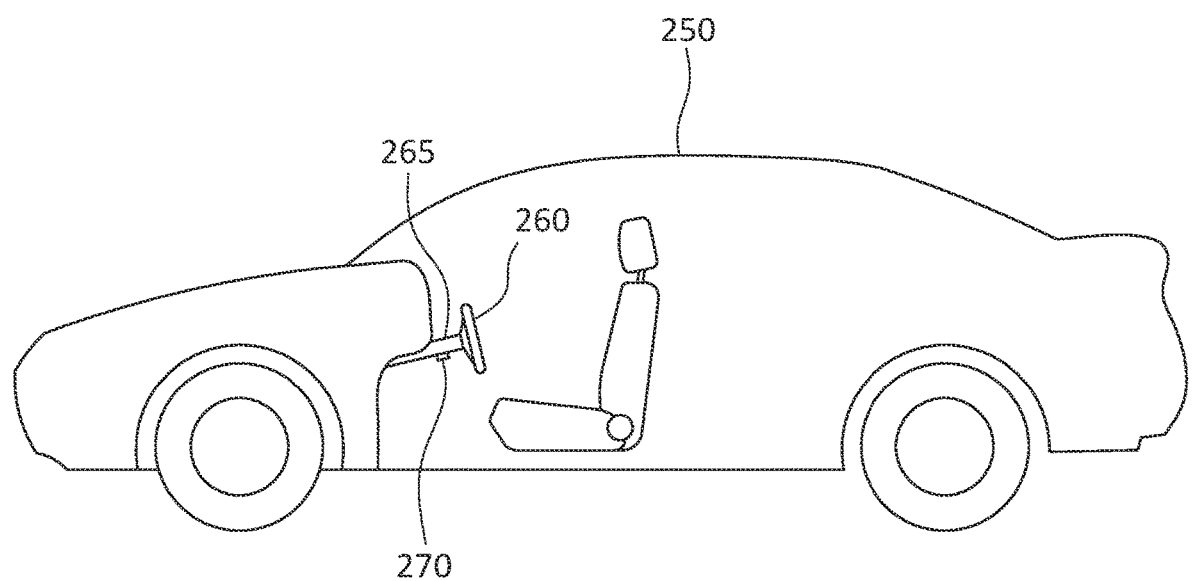
FIG. 2B shows a transmitting device disposed in a vehicle in accordance with an embodiment.

In another embodiment, a transmitting device may be attached permanently to a portion of a vehicle during manufacture of the vehicle. FIG. 2B shows a transmitting device disposed in a vehicle in accordance with an embodiment. Vehicle 250 includes a steering wheel 260 and a steering column 265. A transmitting device 270 is attached to the steering column 265. A transmitting device may be attached to a vehicle at other locations.

In accordance with an embodiment, a vehicle locator system includes a car locator device such as car locator device 100 and a transmitting device such as transmitting device 200. A user may place transmitting device 200 in a car and carry car locator device 100 on his or her person. While the user is in the car, car locator device 100 continually detects a signal emitted by transmitting device 200 and, in response, generates and stores location information representing its current location. When the user is not in the car, the user may employ car locator device 100 to find the car. Car locator device 100 determines a location of the car based at least in part on the stored location information indicating.

Figure 3:
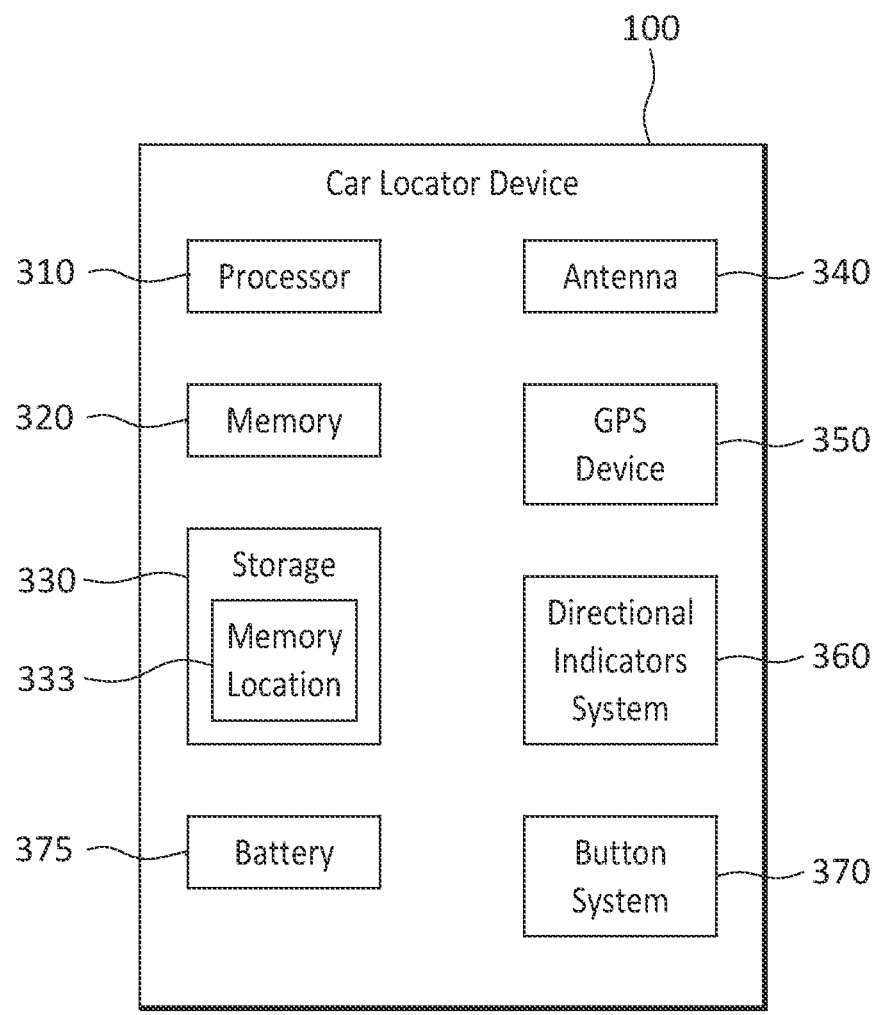
FIG. 3 shows components of a car locator device in accordance with an embodiment.

FIG. 3 shows components of a car locator device in accordance with an embodiment. Car locator device 100 includes a processor 310, a memory 320, a storage 330, a battery 375, an antenna 340, a GPS device 350, a directional indicator display 360, and a button system 370. Processor 310 orchestrates the operations of other components of car locator device 100. Memory 320 is used by other components to store data. Storage 330 is used by other components to store data. Storage 330 includes a memory location 333, which may be used to store data for a particular purpose. Battery 375 may be any suitable type of battery. Other power sources may be used. Antenna 340 is adapted to receive and/or transmit signals using one or more frequencies. GPS device 350 is adapted to receive data from a GPS satellite system and generate data relating to a position or location. GPS devices are known. Directional indicators system 360 includes one or more directional indicators adapted to indicate various directions. Directional indicator system 360 is adapted to cause, from time to time, a selected one of the directional indicators to be illuminated or otherwise activated to indicate a direction. Button system 370 includes a button, such as button 120 of the embodiment of FIG. 1A, and associated mechanical and/or electronic system adapted to generate and transmit to processor 310 a signal when the button is pressed.

Figure 4A:
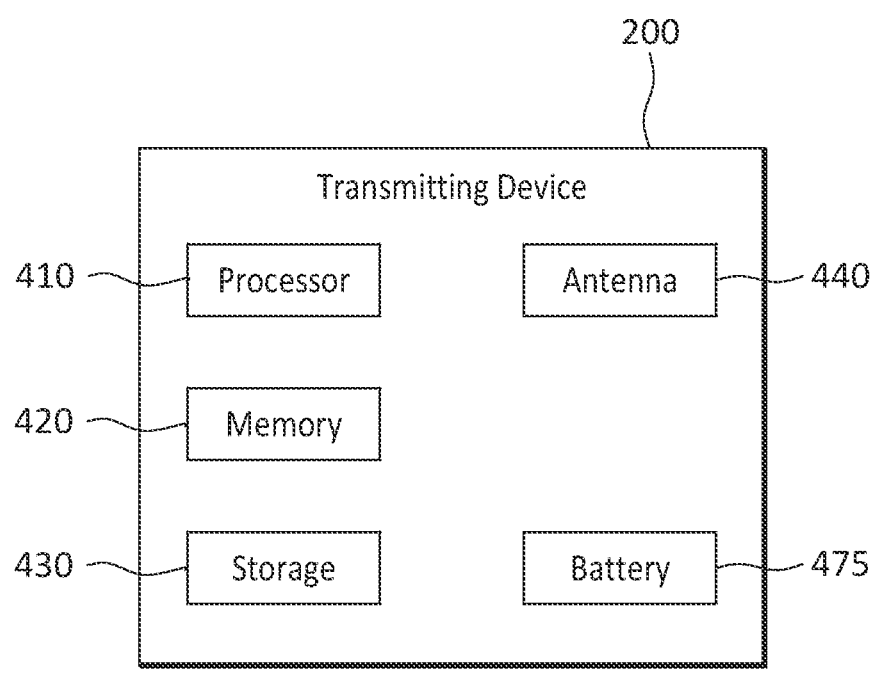
FIG. 4A shows components of a transmitting device in accordance with an embodiment.

FIG. 4A shows components of a transmitting device in accordance with an embodiment. Transmitting device 200 includes a processor 410, a memory 420, a storage 430, an antenna 440, a and a battery 475. Transmitting device 400 may include other components not shown in FIG. 4A.

Figure 4B:
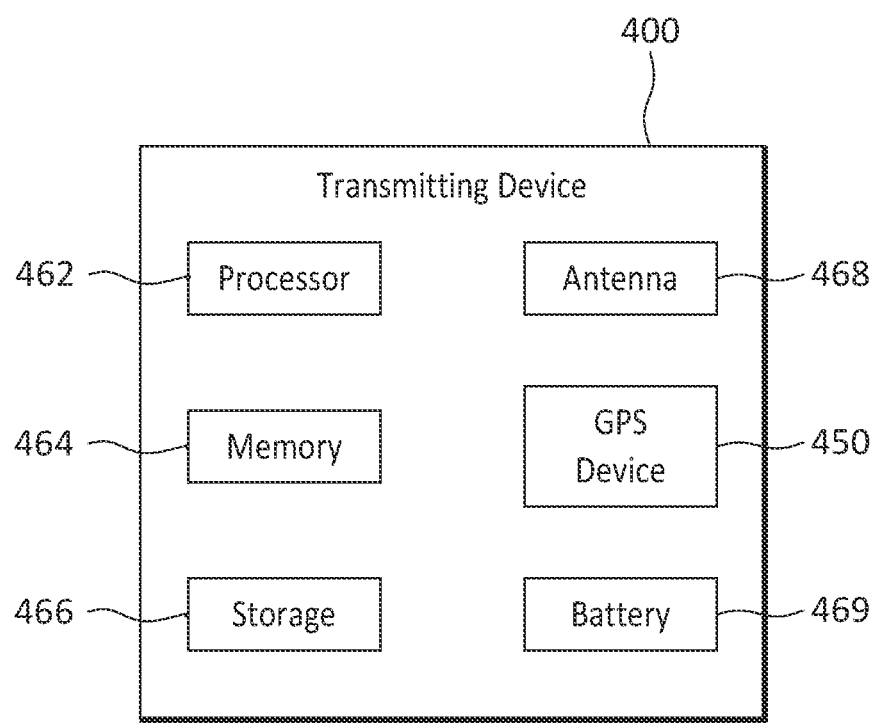
FIG. 4B shows components of a transmitting device in accordance with another embodiment.

FIG. 4B shows components of a transmitting device in accordance with another embodiment. Transmitting device 400 includes a processor 462, a memory 464, a storage 466, an antenna 468, a GPS device 450, and a battery 469. GPS device 450 is adapted to receive GPS signals and determine a location of the transmitting device based on the GPS signals. Transmitting device 400 may include other components not shown in FIG. 4B.

For purposes of illustration, several uses of a car locator system are described below with reference to car locator device 100 of FIG. 1A and transmitting device 200 of FIG. 2A.

In accordance with an embodiment, a user places transmitting device 200 in a selected location in the user's car. For example, the user may place transmitting device 200 in the car's central console, in the glove compartment, in a pocket on the interior side of a door, under a seat, etc. The user may leave the transmitting device in the car on a permanent or substantially permanent basis.

The user carries car locator device 100 on his or her body. For example, the user may attach car locator device 100 to a ring of a keychain. Alternatively, the user may place car locator device 100 in a pocket, in a purse, on a necklace, etc.

Figure 5:
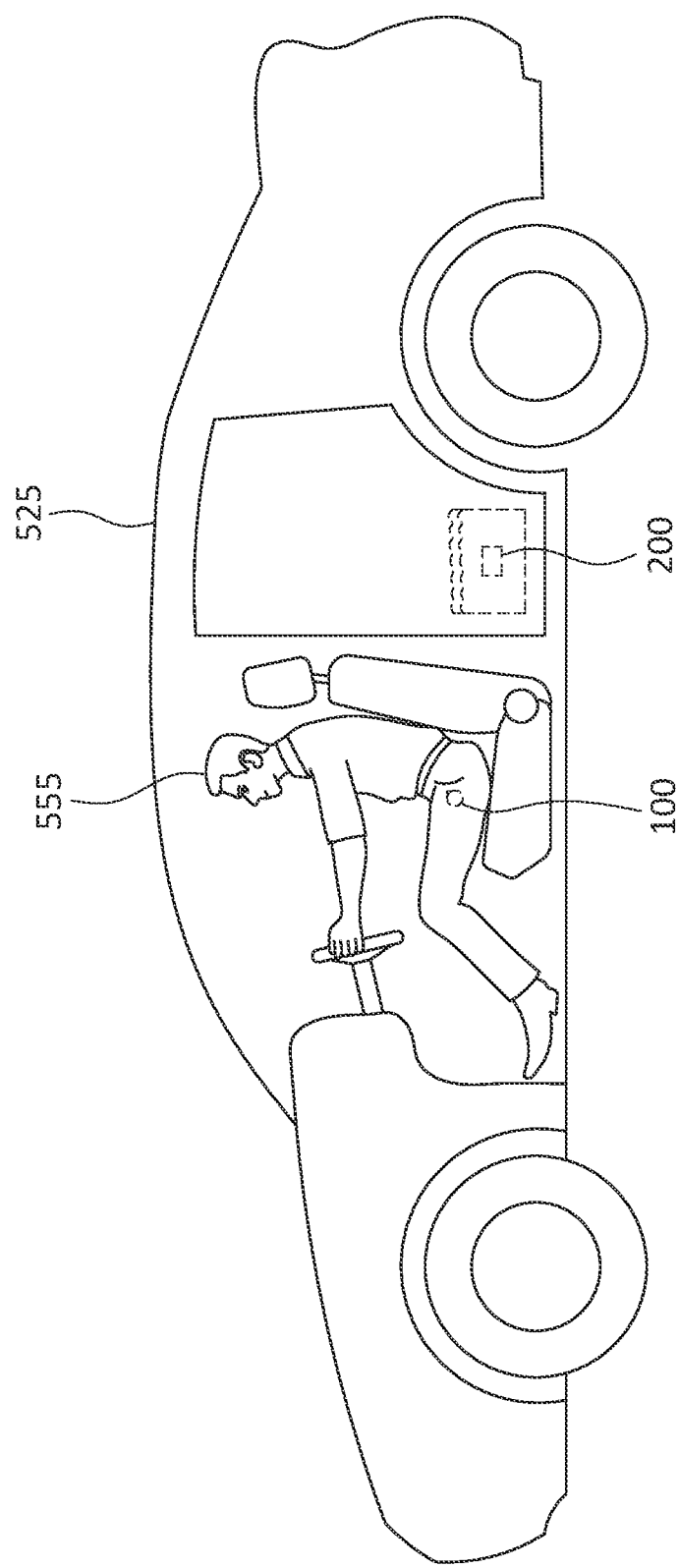
FIG. 5 shows a user driving a car in accordance with an embodiment.

FIG. 5 shows a user 555 driving a car 525 in accordance with an embodiment. The user has car locator device 100 on his or her person. In the illustrative embodiment, user 555 is holding car locator device 100 in a pocket of the user's shirt. Transmitting device 200 is located in a pocket on the interior of a door of the car. Accordingly, when user 555 parks car 525, user 555 may carry car locator device 100 when he or she leaves the car while leaving transmitting device 200 in the car.

In accordance with an embodiment, the user drives a car to a desired location, such as a store, a mall, a movie theater, an office building, etc., and parks the car in a parking lot. The user leaves the car and enters the building. Upon leaving the car, the user leaves transmitting device 100 in the car and carries car locator device 100 into the building. Supposing that the parking is large and contains a large number of parking spots, the user may forget where he or she parked by the time the user leaves the building.

Figure 6:
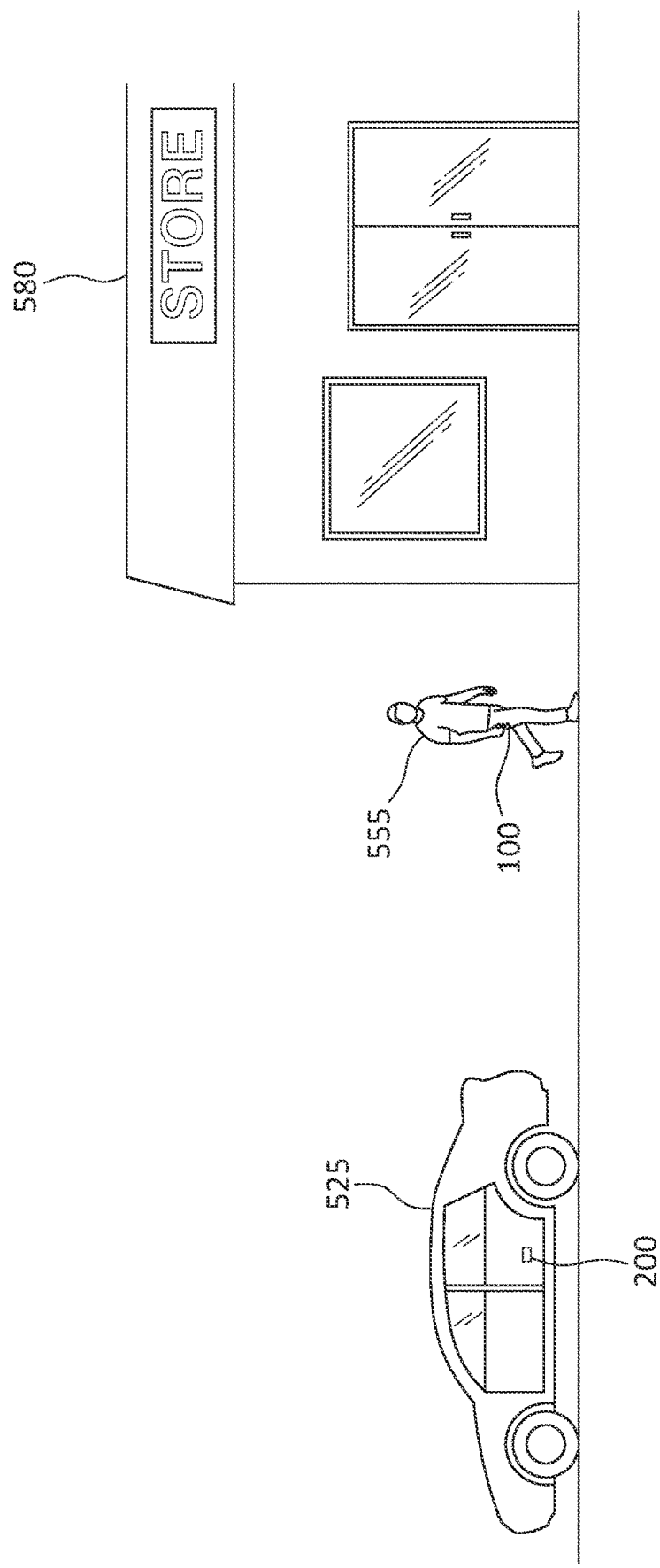
FIG. 6 shows the user and car of FIG. 5 in accordance with an embodiment.

FIG. 6 shows the user and car of FIG. 5 in accordance with an embodiment. User 555 is no longer in car 525. In the illustrative embodiment of FIG. 6, user 555 has left car 525 in a parking space outside of a store 580. The user has left transmitting device 200 inside car 525; however, user 555 is carrying car locator device 100 in his or her hand.

Supposing user 555 enters store 580 and then later exits the store, the user may employ car locator device 100 and transmitting device 200 to locate car 525. In order to locate the car, the user 555 may hold car locator device 100 and press button 120. Preferably, the user holds car locator device 100 in a horizontal position with button 120 on the upper side. In response to the selection of button 120, car locator device 100 determines a location of the car, determines the device's current location, determines a position of the car relative to the current location of the device, and illuminates one of directional indicators 132 134, 136, 138 to indicate a direction for the user to follow in order to find the car. If the user wishes, the user may walk a short distance and again press button 120. Car locator device 100 then again illuminates one of the directional indicators to indicate to user which direction he or she must walk in order to find the car. In this manner, the user may repeatedly press button 120 while walking, and follow the illuminated directional indicators, until the user finds the car.

In various embodiments, car locator device 100 determines the location of transmitting device 200, determines its own location, compares the location of transmitting device 200 to its own location, determines a direction from car locator device 100 to transmitting device 200 (and therefore a direction to the car), and illuminates a directional indicator indicating a direction to the car.

Car locator device 100 may use any one of several methods to determine a relative location of a vehicle.

For example, in accordance with an embodiment, transmitting device 200 continually or periodically (e.g., once per second) transmits a beacon signal. The beacon signal may be, for example, an identifier or a code transmitted at a selected frequency. Thus, for example, transmitting device 200 may transmit the beacon signal periodically from its location in car 525. The range of the signal produced by transmitting device 200 is no greater than a selected, relatively short distance equal to one or several times the length of an automobile. For example, the range of transmitting device 200 may be 10 feet, 20 feet, 25 feet, etc. Other distances may be used.

When car locator device 100 is within range of transmitting device 200, car locator device 100 receives the beacon signal. When car locator device 100 receives a beacon signal from transmitting device 200, car locator device 100, in response, determines its current location based on GPS signals. Car locator device 100 stores, in a selected memory location, information representing its location (e.g., GPS coordinates). For example, in the illustrative embodiment of FIG. 3, car locator device 100 may store information representing its current location in memory location 333 of storage 330. Each time car locator device 100 detects the beacon signal from transmitting device 200, car locator device 100 determines its current location and stores the location information in the memory location. Consequently, car locator device 100 may repeatedly store information indicating its current location in the selected memory location, for example, by overwriting previous location information. Therefore, while car locator device 100 and transmitting device 200 are both in car 525, car locator device 100 repeatedly stores in the selected memory location data indicating its own current location; as a result, car locator device 100 repeatedly stores information indicating the current location of car 525. Car locator device 100 may continue to receive beacon signals from transmitting device 200 even after the user parks the car and exits the car, while the user is within range of transmitting device 200 (for example, within 25 feet of transmitting device 200).

However, when a user parks the car in a parking lot, exits the car and enters a store or other building, the user may go out of range of transmitting device 200 (for example, when the user is more than 25 feet from car 525). If the user is carrying car locator device 100, then car locator device 100 also goes out of range of transmitting device 200. When car locator device 100 goes out of range of transmitting device 100, car locator device stops receiving the beacon signals from transmitting device 200, and consequently stops storing its current location in the selected memory location. Thus, when the user goes out of range of transmitting device 200 (for example, by walking into a store), memory location 333 within car locator device 100 retains location information representing a location of car 525 (or a position within 25 feet of car 525). This location information representing the location of car 525 remains in memory location 333 when car locator device 100 is out of range of transmitting device 200.

Supposing that the user enters the store and later returns to the parking lot, the user may employ car locator device 100 to find car 525. The user may press button 120, and, in response, car locator device 100 accesses the location information stored in memory location 333. Car locator device 100 also determines its own current location based on GPS information. Car locator device 100 compares its own current location with the location information stored in memory location 333. Car locator device 100 determines a relative direction from car locator device 100 to car 525 based on the comparison. Car locator device 100 illuminates a selected directional indicator 132, 134, 136, 138 corresponding to the determined relative direction. The user may press button 120 multiple times while walking to the car to obtain additional directional information.

Figure 7A:
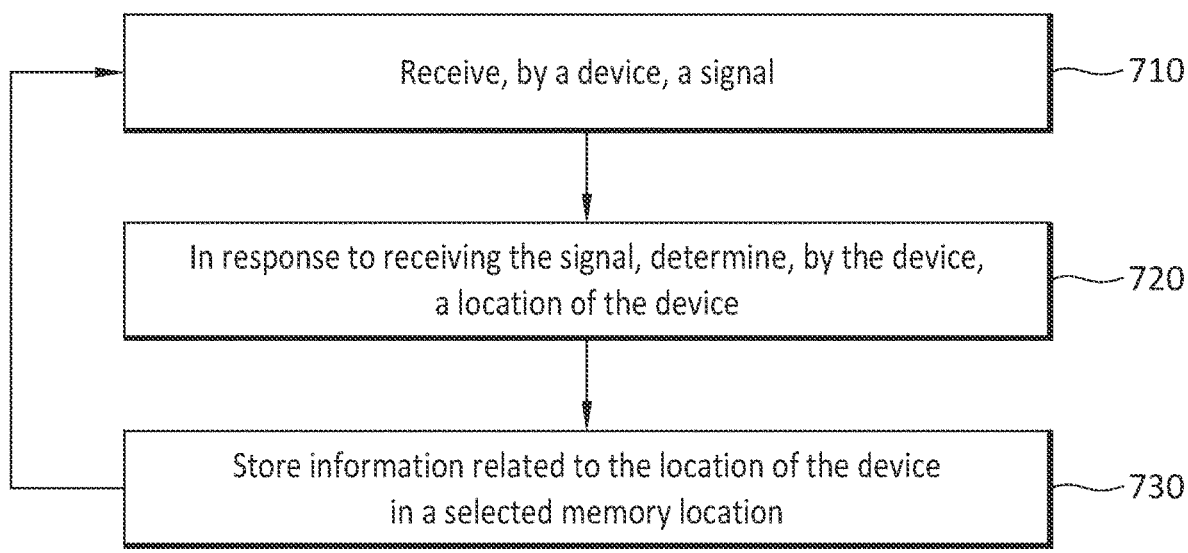
FIGS. 7A-7B show a flowchart of a method of determining a location of vehicle in accordance with an embodiment.
Figure 7B:
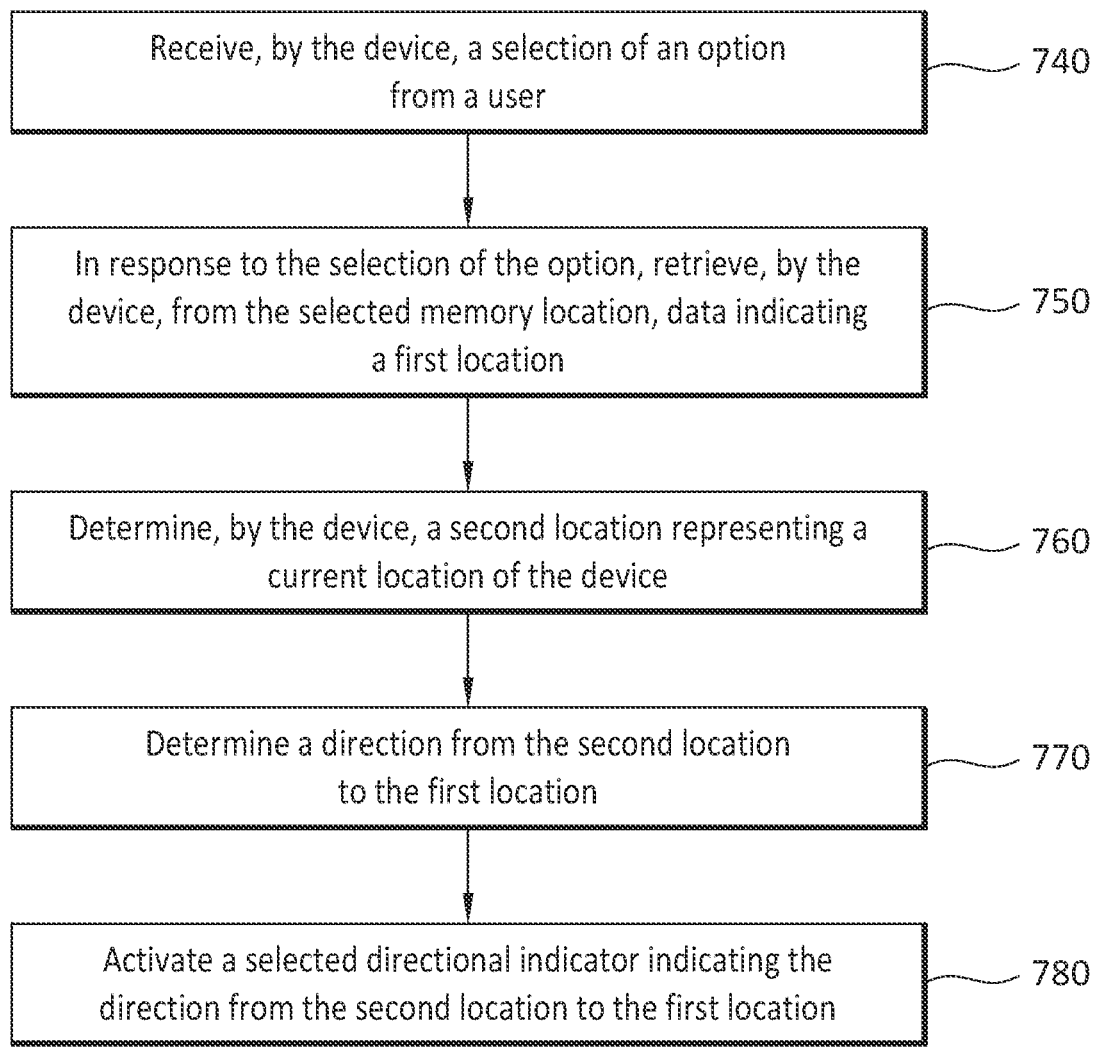

FIGS. 7A-7B show a flowchart of a method of determining a location of car in accordance with an embodiment. Referring to FIG. 7A, at step 710, a signal is received by a device. The signal may be received periodically. In the illustrative embodiment, a user carries car locator device 100 on his or her person while driving car 525. Transmitting device 200 is disposed in a selected (or permanent) location in car 525. While the user drives the car, transmitting device 200 transmits periodically a beacon signal. Antenna 340 of car locator device 100 receives periodically the beacon signal from transmitting device 200. Antenna 340 transmits the signals to processor 310. Processor 310 receives the signal. At step 720, a location of the device is determined, by the device, in response to receiving the signal. In the illustrative embodiment, when processor 310 receives a beacon signal, processor 310, in response, causes GPS device 350 to determine a location of car locator device 100. In response, GPS device 350 generates information indicating the location of car locator device 100 and transmits the information to processor 310. At step 730, information related to the location of the device is stored in a selected memory location. In the illustrative embodiment, processor 310 stores the location information in memory location 333 of storage 330. The location information stored in memory location 333 represents the location of transmitting device 200 and therefore also represents the location of car 525. Because the signal is periodic, the routine now returns to step 710 and an additional signal is received.

In an illustrative example, the user parks car 525 in a parking lot, exits the car, and enters a store or other building. In doing so, the user goes out of the range of transmitting device 200, causing car locator device 100 to go out of range of transmitting device 100. As a result, car locator device no longer receives signals from transmitting device 200.

In the illustrative embodiment, the user returns to the parking lot and employs car locator device to find car 525. Unable to remember where car 525 is parked, the user presses button 120 on car locator device 120. Referring now to FIG. 7B, at step 740, a selection of an option is received, by the device, from a user. Processor 310 receives from button system 370 information indicating that button 120 has been selected. At step 750, in response to the selection of the option, data indicating a first location is retrieved, by the device, from the selected memory location. Thus, processor 310 retrieves from memory location 333 the most recently stored location information (representing the location of transmitting device 200 and therefore the location of car 525). At step 760, a second location representing a current location of the device is determined. Processor 310 causes GPS device 350 to determine a current location of car locator device 100. GPS device 350 generates information indicating a current location of car locator device 100 and transmits the current location information to processor 310.

At step 770, a direction from the second location to the first location is determined. Processor 310 compares the current location information (representing the current location of car locator device 100) to the location information retrieved from memory location 333 (representing the location of car 525), and determines a direction from the current location of car locator device 100 to the location of car 525. For example, in some embodiments, car locator device 100 may include a compass adapted to provide direction data relating to north, south, east, and west directions. Processor 310 may determine the direction from the current location of device 100 to the location of car 525 based on the current location information, the location information retrieved from memory location 333, and direction data obtained from the compass. Other methods of determining a relative direction from the current location of device 100 to the location of car 525 may be used.

At step 780, a selected directional indicator indicating the direction from the second location to the first location is activated. Referring to FIG. 1, processor 310 identifies one of directional indicators 132, 134, 136, 138 that corresponds to (or most closely corresponds to) the direction from the current location of car locator device 100 to the location of car 525. In the illustrative embodiment, processor 100 causes directional indicators system 360 to illuminate the selected directional indicator to indicate to the user which direction to follow to find car 525.

Figure 7C:
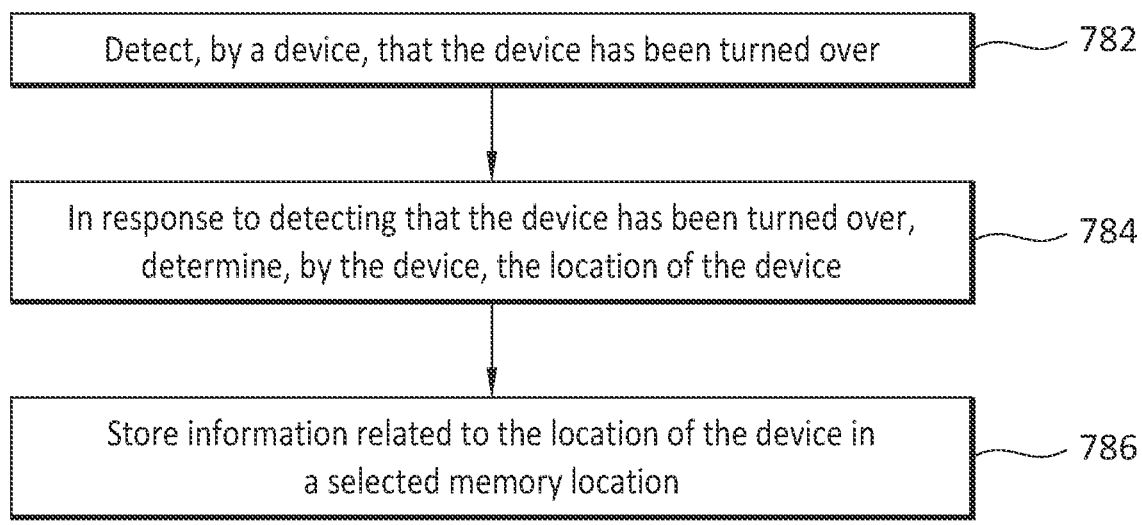
FIG. 7C shows a flowchart of a method in accordance with another embodiment.

FIG. 7C is a flowchart of a method of determining a location of a vehicle in accordance with another embodiment. FIG. 7C is discussed below with reference to FIGS. 14A-14B, which are discussed in detail below.

Figure 14B:
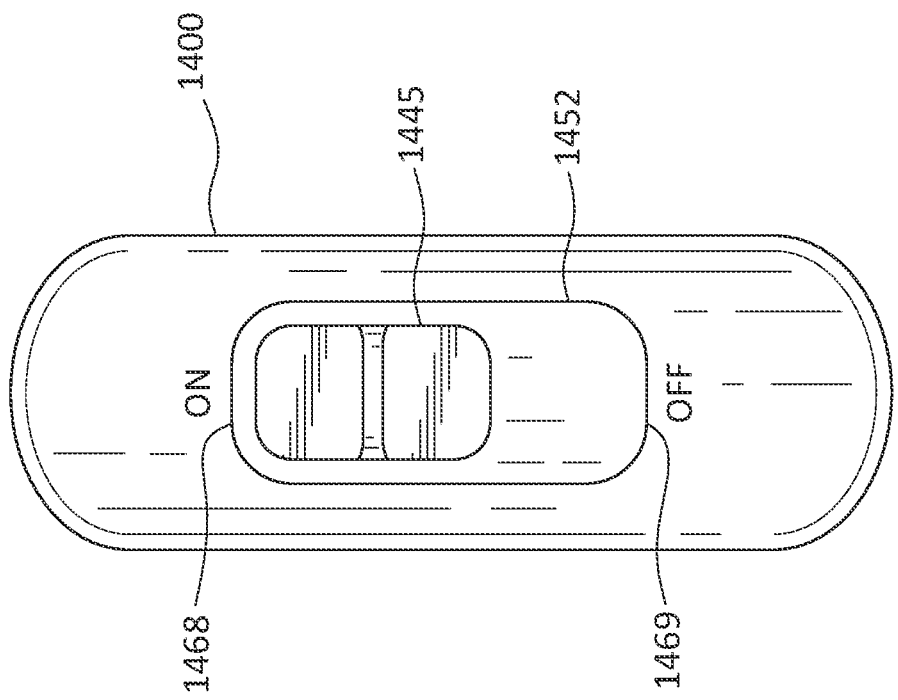
FIGS. 14A-14B show top and bottom sides of a car locator device in accordance with another embodiment.
Figure 14A:
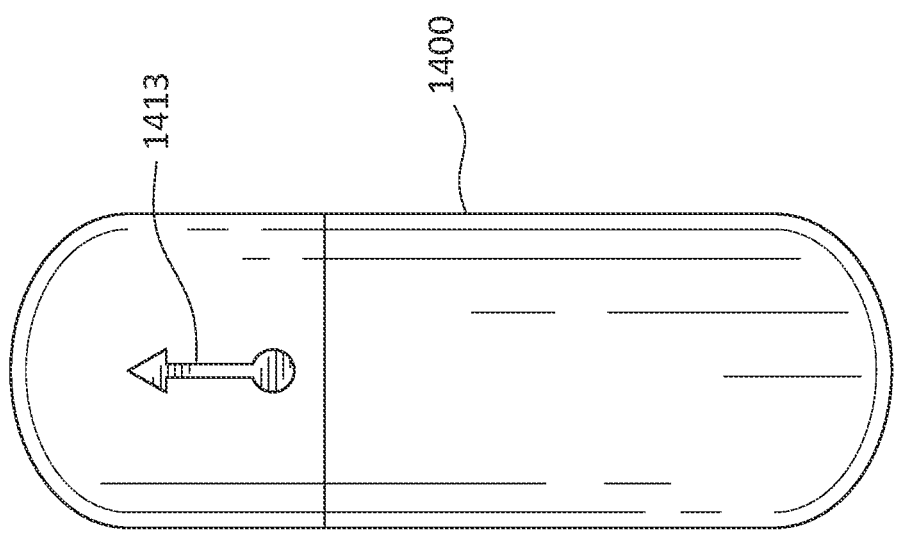

FIGS. 14A-14B show top and bottom sides of a car locator device in accordance with another embodiment. FIG. 14A shows a top side of a car locator device 1400. In the illustrative embodiment, car locator device 1400 includes a case and a directional indicator 1413 disposed on an outside surface of the case. In other embodiments, a directional indicator may be located in a different location, for example, within the case, or may be displayed on a display screen. In the illustrative embodiment, car locator device 1400 is not adapted to be attached to a keychain, but may be stored in a user's pocket, bag, purse, etc. For example, a user may keep car locator device 1400 in a pocket while driving a car. In another embodiment, car locator device 1400 may have a fastener adapted to be attached to a keychain.

In the illustrative example of FIG. 14A, directional indicator 1413 has a form similar to a compass needle. Directional indicator 1413 is adapted to rotate or turn in order to indicate a selected direction. In other embodiments, a directional indicator may have a different form.

FIG. 14B shows a bottom side of car locator device 1400. The bottom side of car locator device 1400 includes a switch 1445. In the illustrative example of FIG. 14B, switch 1445 is disposed in a track 1452; however, in other embodiments, a switch may be used without a track. In a well-known manner, switch 1445 has an ON position 1468 and an OFF position 1469; switch 1445 may be moved between ON position 1468 and OFF position 1469. Switch 1445 controls the on/off status of car locator device 1400. When switch 1445 is in the ON position 1468, car locator device 1400 is powered on; when switch 1445 is in OFF position 1469, car locator device is powered off.

Figure 8:
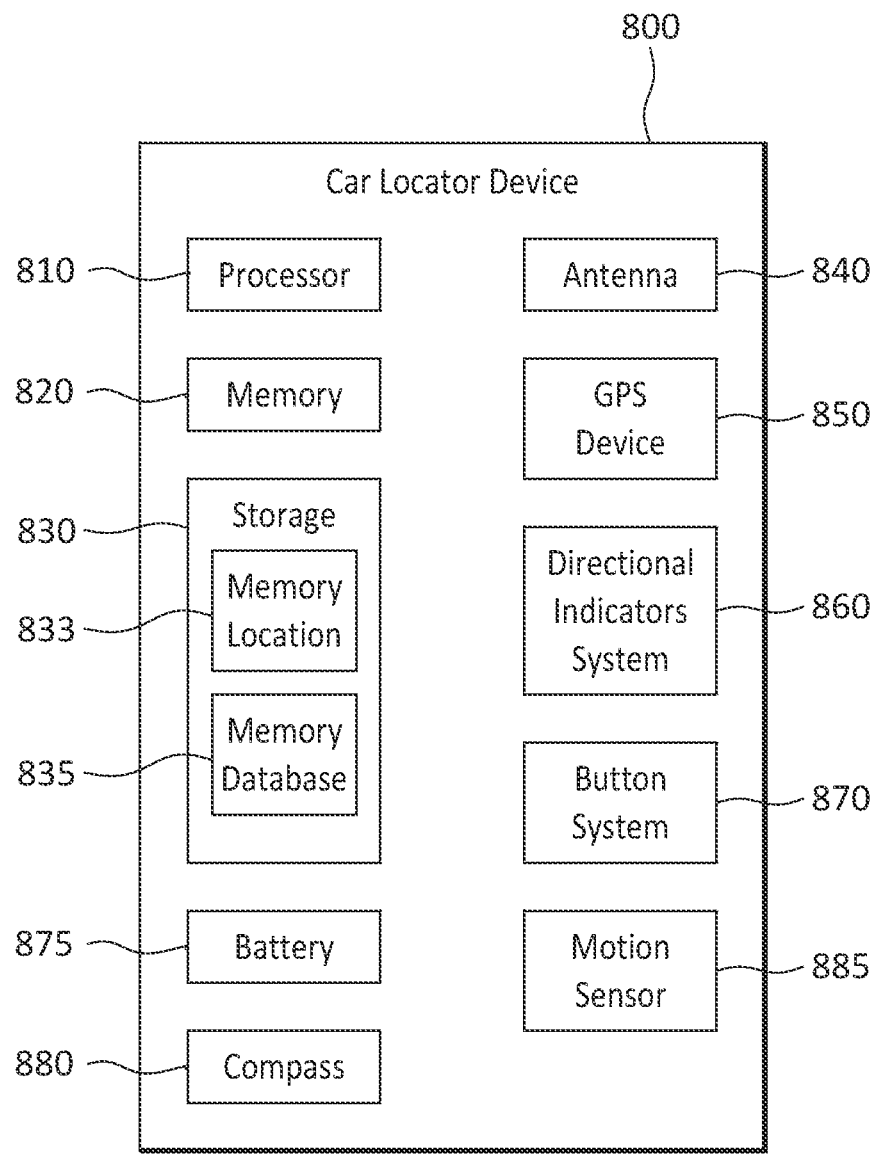
FIG. 8 shows a car locator device in accordance with another embodiment.

Car locator 1400 may include components similar to those shown in FIG. 8, for example. Accordingly, car locator 1400 may include a processor (e.g., processor 810), a GPS device (e.g., GPS device 850), a memory location (e.g., memory location 833), a motion sensor (e.g., motion sensor 885), a compass (e.g., compass 880), etc. Car locator 1400 may include other components.

In accordance with an embodiment, a user may carry car locator device 1400 on his or her person, for example, in a pocket. As the user drives in a car, the user may maintain car locator device 1400 in a powered off state. When the user parks the car, for example, in a parking lot, the user may hold the device and turn on the device by moving switch 1445 from the OFF position to the ON position.

In accordance with an embodiment, a user may activate the location functions of car locator device 1400 by moving the device in a predetermined manner. The device includes a motion detector adapted to detect when the device experiences the predetermined movement.

In an illustrative embodiment, a user may activate the location function of car locator device 1400 turning the device over (e.g., turning the device upside down). For example, the user may hold the car locator device 1400 in the user's hand, in a "face up" position, and turn the device over so that the device is in a "face down" position. Referring to FIGS. 14A-14B, the device may be in a "face up" position when the top side shown in FIG. 14A is facing up, and in a "face down" position when the top side shown in FIG. 14A is facing down. In other embodiments, a user may activate the location function of the device by moving the device through a different type of motion.

Car locator device 1400 includes a motion sensor (identical or similar to motion sensor 885 shown in FIG. 8) which is adapted to detect whether device 1400 is in a face up position or in a face down position. Accordingly, motion sensor 885 is adapted to determine when the device has been turned over from a face up position to a face down position. Car locator device 1400 may include other components identical or similar to those shown in FIG. 8.

Referring now to FIG. 7C, at step 782, a device detects that the device has been turned over. When the user turns car locator device 1400 upside down, the motion sensor (e.g., motion sensor 885) detects that the device has been turned over.

At step 784, in response to detecting that the device has been turned over, the device determines the location of the device. For example, the processor (e.g., processor 810) may obtain the device's location from the GPS device (e.g., GPS device 850).

At step 786, information related to the location of the device is stored in a selected memory location. For example, the processor (e.g., processor 810) may store the location data in a selected memory location (e.g., memory location 833).

The user may then enter a store or other building, and subsequently use car locator device 1400 in a manner similar to that described herein to locate the car in the parking lot. For example, when the user exits the building, the user may hold car locator device 1400 in a face up position and observe directional indicator 1413. Car locator device 1400 may retrieve the stored location information representing the location of the user's car, determine the device's current location, and use compass 880 to determine a relative direction from the device to the user's car. For example, device 1400 may obtain direction data relating to north, south, east, west directions from compass 880 and use the stored location information, the device's current location, and the direction data from the compass to determine a relative direction to the user's car. Car locator device 1400 may then use directional indicator 1413 to indicate to the user the relative direction of the user's car.

In one embodiment, after car locator device 1400 has stored location information representing the location of the user's car in the selected memory location, then as long as device 1400 remain power on, the device causes directional indicator 1413 to indicate the relative direction to the user's car.

In another embodiment, after car locator device 1400 has stored location information representing the location of the user's car in the selected memory location, the user may turn off the device, e.g., by moving switch 1445 to the powered off position. The location information remains stored in the selected memory location while the device is powered off. When the user later turns the device on, e.g. by moving switch 1445 to the powered on position, car locator device 1400, in response, retrieves the stored location information (representing the location of the user's car) from the selected memory location, obtains location data from the GPS device representing the device's current location, and causes directional indicator 1413 to indicate a relative direction from the device's current location to the user's car.

Figure 7D:
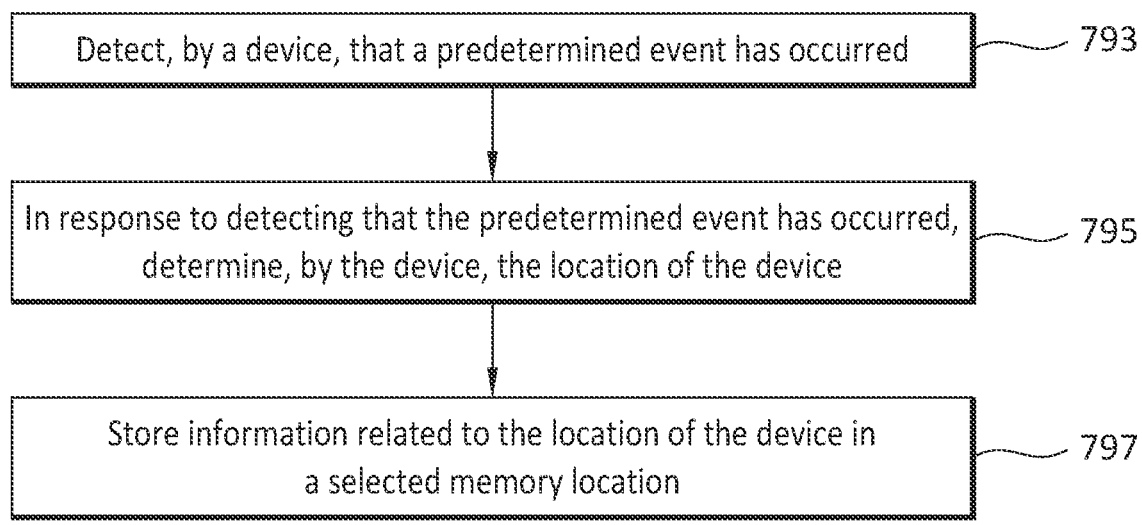
FIG. 7D is a flowchart of a method in accordance with another embodiment.

In various embodiments, a car locator device may determine and store its own location in response to any predetermined event. FIG. 7D is a flowchart of a method of determining a location of a vehicle in accordance with another embodiment. At step 793, a device detects that a predetermined event has occurred. The event may occur when the device is turned over, or may occur when the device detects that it is more than a predetermined distance from another object, or may occur when the user presses a particular button or moves a particular switch from one position to another position, or may occur when a user says a predetermined word or phrase, or may occur when the device detects any other predetermined event. At step 795, in response to detecting that the predetermined event has occurred, the device determines the location of the device. At step 797, information related to the location of the device is stored in a selected memory location. At a subsequent time, the device may retrieve the stored location information and indicate to the user a relative direction to from the device's current location and the location corresponding to the stored location information.

Figure 7E:
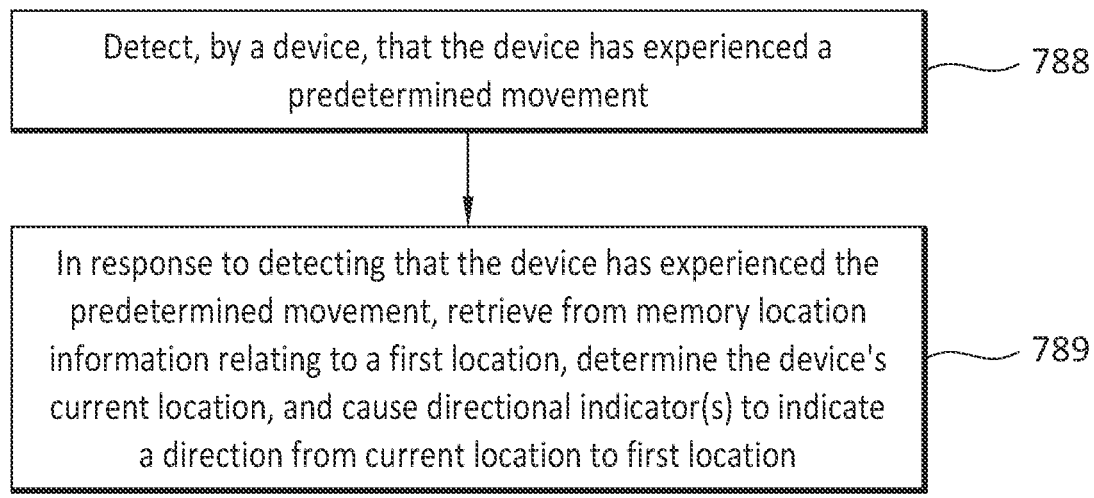
FIG. 7E is a flowchart of a method of determining a location of a vehicle in accordance with another embodiment.

In another embodiment, a car locator device is adapted to respond to a predetermined event by activating one or more directional indicators and causing the directional indicators to indicate a direction to a previously recorded location. For example, a car locator device may respond to a predetermined movement (such as being turned over) by activating one or more directional indicators and causing the directional indicators to indicate a direction to a previously recorded location. FIG. 7E is a flowchart of a method in accordance with another embodiment. In an illustrative embodiment, a user parks his or her car in a parking lot, and turns on car locator device 1400. In the illustrative embodiment, when device 1400 is powered on, the device determines its current location and stores data representing the current location in a selected memory location. The user then enters a building, for example, a shopping mall. At a later time, the user exits the shopping mall and wishes to employ car locator device 1400 to locate the parked car. In order to activate the device's directional indicators, the user moves the device in a predetermined manner. In the illustrative embodiment, the user turns the device over. Specifically, the user holds the device such that switch 1445 is facing up and indicator 1413 is facing down, and then turns the device over so that switch 1445 is facing down and indicator 1413 is facing up. Referring to FIG. 7E, at step 788, a device detects that it has experienced a predetermined movement. In the illustrative embodiment, car locator device 1400 detects that it has been turned over. At step 789, the device, in response to detecting that it has experienced the predetermined movement, retrieves from a selected memory location information relating to a first location (e.g., location information indicating where the user's car is parked), determines the device's current location, and causes one or more directional indicators to indicate a direction from the device's current location to the first location. Car locator device 1400, in response to detecting that it has been turned over, retrieves the stored location information, determines its current location, and causes indicator 1413 to indicate a direction from the current location to the car's location.

In accordance with another embodiment, a transmitting device includes GPS capability. This embodiment is discussed below with reference to car locator device 100 of FIG. 1A and transmitting device 400 of FIG. 4B.

Transmitting device 400 periodically determines coordinates representing its own location based on GPS information. Transmitting device 400 periodically or continuously transmits a signal containing its most recently determined location coordinates. Car locator device 100 may receive the signals from transmitting device 400, extract the location information, and store the location information in a selected memory location.

Transmitting device 400 may determine its own location based on GPS information at a selected interval, for example, once per second, and may transmit a signal containing its coordinate location information at any selected interval, for example, once per second. Other time intervals may be used.

Car locator device 100 is adapted to receive from transmitting device 400 the signal containing location information. When car locator device 100 receives the location signal from transmitting device 400, car locator device 100 stores the location coordinates of the transmitting device 400 in a selected memory location. If car locator device 100 receives additional signals containing updated location information from transmitting device, car locator device 100 stores the updated location information in the selected memory location (overwriting any previous location information). Therefore, the selected memory location in car locator device 100 at all times stores the most recent location information received from transmitting device 400.

At a subsequent point in time, car locator device 100 may access the location information stored in the selected memory location and determine the location of transmitting device 400, which represents the location of the car. Car locator device 100 may also determine its own current location based on GPS information, determine a relative direction from its current location and the location stored in memory (representing the location of the car), and indicate to the user a relative direction to the car. In the illustrative embodiment, car locator device 100 may determine the car's location based on the information stored in the selected memory location, determine its own current location based on GPS information, and illuminate one of the directional indicators 132, 134, 136, 138 to indicate which direction the user should walk in order to locate the car.

For example, supposing the user drives the car from home to a store, transmitting device 400 (which is located in the car) transmits its location coordinates periodically (e.g., once per second), and car locator device 100 (which is also in the car) repeatedly receives and updates the location coordinates of transmitting device 400. When the user parks in a parking lot near the store, transmitting device 400 (located inside the car) transmits a signal containing location its current location coordinates (representing the location of the car in the parking lot). The car locator device 100 (while user is still inside the parked car in the parking lot) receives this signal and stores, in the selected memory location, the coordinate location information associated with the car's location in the parking lot. When the user leaves the car and walks into the store, transmitting device 400 continues to transmit a signal containing the location information representing the car's location in the parking lot. Car locator device 100 continues to receive this information until the user walks out of range of transmitting device 400, and may rewrite the information multiple times. As a result, when the user walks into the store, car locator device 100 holds, in the selected memory location, location information associated with the car's location in the parking lot.

When the user is out of range, car locator device 100 may no longer be able to receive signals from transmitting device 200. However, as the user goes out of range of transmitting device 400, the selected memory location of car locator device 100 stores the location information most recently received from transmitting device 400, which represents the location of the car in the parking lot near the store. As long as the car is not moved while the user conducts his or her business, the car locator device 100 will continue to store the location information representing the car's actual location in the parking lot.

In any event, when the user later returns and approaches the parking lot to find the car, the user may press button 120, and car locator device 100, in response, accesses the location information stored in the selected memory location, determines the car's location based on the information stored in the selected memory location, determines a relative direction from car locator device 100 to the car, and illuminates a selected directional indicator in order indicate to the user a direction to follow to find the car. (In fact, the user may press button 120 at any time, at any location (regardless of the distance to the car), and car locator device 100, in response, determines the car's location (relative to the location of the car locator device 100) based on the information stored in the selected memory location, and illuminates a selected directional indicator indicating a direction to the car).

In accordance with another embodiment, transmitting device 400 may both periodically transmit location information in the manner described above and continually or periodically transmit a beacon signal having a selected frequency. Car locator device 100 receives and stores the location information in a selected memory location, in the manner described above. When the user presses button 120, car locator device 100 determines its own location based on GPS information, and determines the location of the car based on the location information stored in the selected memory location. Car locator device 100 then illuminates a direction indicator to indicate the car's location relative to the car locator device. If car locator device 100 determines that its own location is the same as the location of the car based on GPS information, car locator device 100 may switch modes and determines the location of the car based on the beacon signal received from transmitting device 400.

In accordance with another embodiment, transmitting device 200 continually or periodically transmits a beacon signal having a selected frequency and identifying information. The beacon signal may have a selected range, for example, 100 meters, 500 meters, 1000 meters, 2000 meters, or one kilometer. Car locator device 100 is adapted to receive the beacon signal transmitted by transmitting device 200 and determine the location of the car based on the signal. For example, car locator device 100 may use characteristics of the beacon signal (e.g., signal strength, direction of signal, etc.) to determine the location of transmitting device 200. Car locator device 100 may receive a plurality of beacon signals at intervals and determine the location of the car based on the plurality of beacon signals (for example, by a triangulation method). When car locator device 100 determines the location of transmitting device 200, car locator device 100 may store information representing the location of transmitting device 200 in a selected memory location. For example, in the illustrative embodiment car locator device 100 may store information representing the location of transmitting device 200 in memory location 333 of storage 330. Car locator device 100 may from time to time update/overwrite the information in the selected memory location to indicate the location information received in the most recent signal(s) received from transmitting device. Car locator device 100 also periodically determines its own location, for example, based on GPS information. When a user presses button 120, car locator device 100 compares the location of transmitting device 200 (stored in the selected memory location) to its own location, and determines a relative location of the car. Car locator device 100 then illuminates one of the directional indicators 132, 134, 136, 138 to indicate which direction the user should walk in order to locate the car.

In accordance with another embodiment, transmitting device 200 receives signals from one or more cell towers and determines its own location based on the received signals. For example, transmitting device 200 may receive signals from two or more nearby cell towers and extract information from the signals. Based on the extracted information, transmitting device 200 may determine its own location coordinates. Transmitting device 200 may then transmit periodically or continuously a signal containing information representing its own location. Car locator device 100 may receive the signals from transmitting device 200, extract the location information, and store the location information in a selected memory location.

In accordance with another embodiment, transmitting device 200 may continually or periodically transmit its location information to a remote memory location accessible via the Internet. When a user presses button 120, car locator device 100 determines its own location, accesses the remote memory location via the Internet and obtains the location information stored in the remote memory location. Car locator device 100 then compares its own location to the location of transmitting device 200 (obtained via the Internet), and determines a direction from car locator device 100 to transmitting device 200. Car locator device 100 then illuminates one of directional indicators 132, 134, 136, 138 to indicate a direction toward the car.

FIG. 8 shows a car locator device in accordance with another embodiment. Car locator device 800 includes components similar to those of car locator device 100 as shown in FIG. 3, including a processor 810, a memory 820, a storage 830, a battery 875, an antenna 840, directional indicators system 860, and button system 870. Storage 830 includes a memory location 833. Storage 830 also includes a movement database 835 adapted to store information concerning movements of device 800. Car locator device 800 also includes a compass 880 and a motion sensor 885. Compass 880 provides directional data. Motion sensor 885 provides data indicating speed and acceleration as device 800 moves. Motion sensor 885 may also provide data indicating whether device 800 moves up or down, and data indicating whether device 800 has experienced a particular type of movement, such as being turned over (turned upside down) or another type of movement. Compass may be of a magnetic type or a non-magnetic type. In other embodiments, car locator device 800 may include other components, such as a gyroscope.

Processor 810 from time to time obtains directional data from compass 880 and motion data from motion sensor 885 and determines a direction and speed at which device 800 is moving. Processor 810 may periodically generate movement data representing a path followed by device 800. For example, such movement data may include a plurality of vectors (each vector including a first value representing a two dimensional or three-dimensional direction and a second value representing a distance) that define a path followed by device 800 over a defined time period. Movement data may also include time information. Processor 810 may store movement data in movement database 835 in storage 830.

In accordance with an embodiment, car locator device 800 uses directional information generated by compass 880 and motion data from motion sensor 885 to monitor its own movement. In particular, car locator device 800 uses directional and movement data to determine whether the device is in a moving vehicle or being carried by a walking individual. Car locator device 800 determines a moment when this movement information indicates a change from being in a moving vehicle to being carried by a walking individual, and begins to record movement data representing a path followed by the walking individual. At a subsequent time, car locator device 800 accesses the recorded movement data and illuminates directional indicators in a manner to enable a user to retrace the path (in a reverse direction) to locate the vehicle.

Thus, for example, in accordance with an embodiment, car locator device 800 may determine whether the user is driving a car or walking. For example, car locator device 800 may monitor its position and movements based on GPS information and/or on directional and movement data, and determine its own speed, movement patterns, etc. For example, car locator device 100 may examine speed information and directional information, determine that the user is driving when its own speed is above a predetermined limit or when movement patterns resemble movement patterns associated with an automobile. In contrast, car locator device 100 may determine that the user is walking when its own speed is lower than a predetermined limit and/or when it detects movement patters associated with human walking.

In accordance with an embodiment, when car locator device 100 detects that the user switches from driving to walking, car locator device 100 determines its own location based on GPS information and stores location information representing its own location (and also representing the location of a vehicle) in a selected memory location (e.g., memory location 333). At a later time, car locator device 100 may utilize the location information stored in the selected memory location to determine a relative direction toward a car, and then illuminate a corresponding directional indicator to guide a user to the location of the vehicle.

Figure 9:
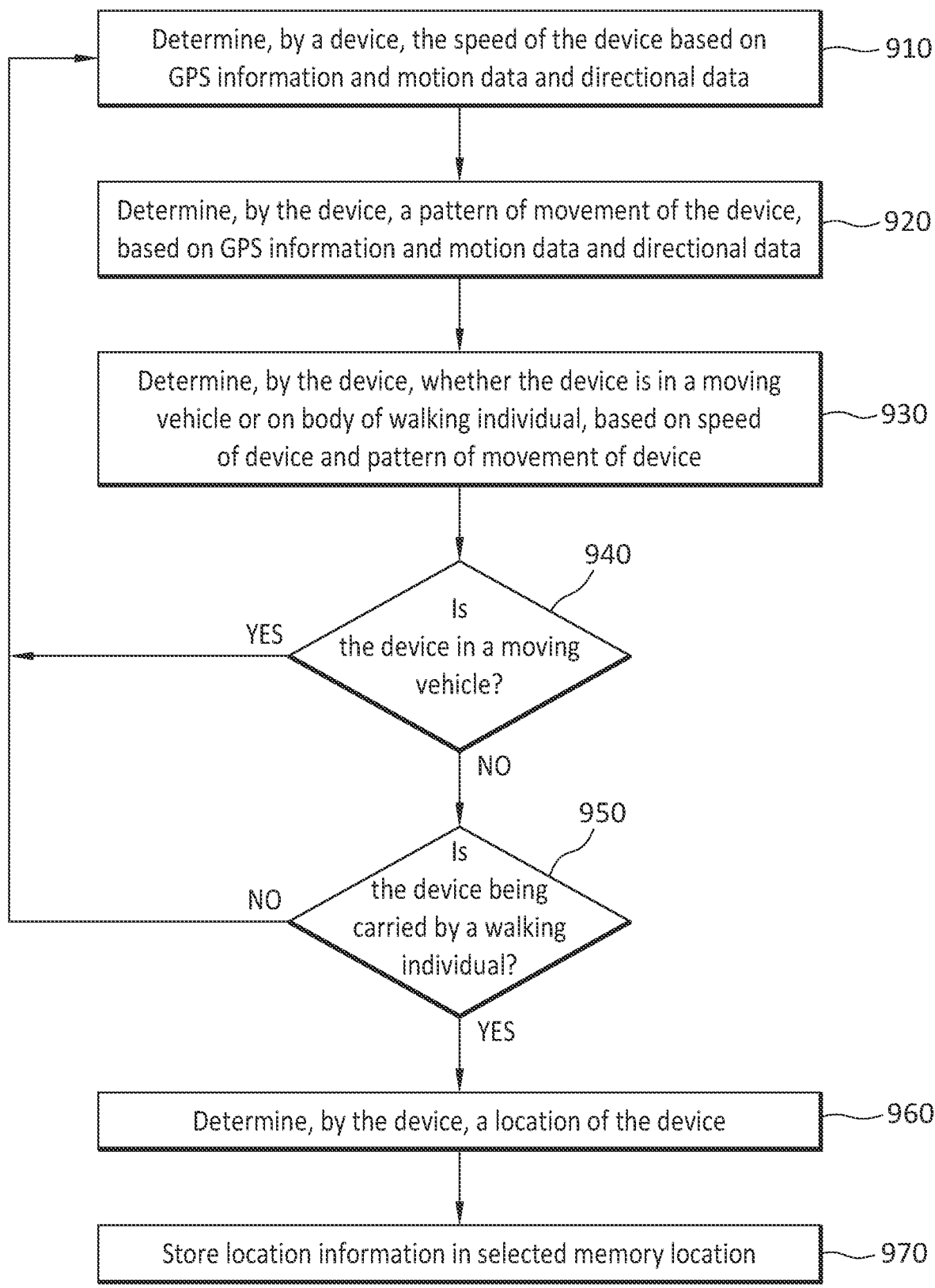
FIG. 9 is a flowchart of a method in accordance with an embodiment.

FIG. 9 is a flowchart of a method in accordance with an embodiment. The method outlined in FIG. 9 may be implemented, for example, when a user parks a vehicle in a parking garage in which a GPS device cannot receive GPS signals and therefore cannot function. Instead, car locator device 800 uses compass information and movement data to monitor its own movements. Car locator device 800 determines when the user stops driving, gets out of the car, and starts walking, and then records movements of a user as the user walks from the vehicle. The user's movements are recorded as the user walks from the vehicle to another location (such as a store or other building). When the user wishes to return to the car at a later time, car locator device 800 accesses the stored movement data and illuminates directional indicators in a manner to enable the user to follow the path in reverse to locate the car.

Accordingly, at step 910, the speed of the device is determined by the device based on GPS information, directional information, and/or motion data. Processor 810 receives GPS data from GPS device 850 and motion data from motion sensor 885 and determines the speed of the device. Processor 810 may also receive directional information from compass 880. For example, if GPS device 850 does not generate location data (for example, if the vehicle is in a parking garage and GPS device 850 cannot receive GPS signals), processor 810 may obtain directional information from compass 880.

At step 920, a pattern of movement of the device is determined by the device based on GPS information, directional information, and motion data. Processor 810 receives GPS data from GPS device 850 and motion data from motion sensor 885 and determines a pattern of movement of the device. For example, processor 810 may determine that the device moves one hundred feet to the north at a speed of 27 miles per hour, and then turns right and moves eighty feet to the east at a speed of 24 miles per hour. Alternatively, processor 810 may determine that the device moves six feet to the west at a speed of three miles per hour and then moves twenty three feet to the north at a speed of four miles per hour.

At step 930, the device determines whether the device is in a moving vehicle or on the body of a walking individual, based on the speed of the device and the pattern of movement of the device. Processor 810 analyzes the speed information and the pattern of movement data and determines whether the speed and movements are associated with the movements of a vehicle or the movements of a person walking.

Referring to block 940, if the device is in a moving vehicle, the routine returns to step 910 and the device continues to monitor its speed. If the device is not in a moving vehicle, the routine proceeds to block 950.

In accordance with block 950, if the device is being carried by a walking individual, the routine proceeds to step 960. If the device is not being carried by a walking individual, the routine returns to step 910 and the device continues to monitor its speed.

At step 960, the device determines a location of the device. After processor 810 determines that the device is now being carried by a walking individual, processor 810 determines a location of the device based on GPS information generated by GPS device 850.

At step 970, location information is stored in a selected memory location. Processor 810 stores the location information in a selected memory location, such as memory location 833 within storage 830 (shown in FIG. 8).

In accordance with another embodiment, a car locator device generates and stores movement data indicating a path followed by the device while carried by a walking individual. At a subsequent time, the car locator device retrieves and uses the movement data to determine a path to a vehicle.

Figure 10A:
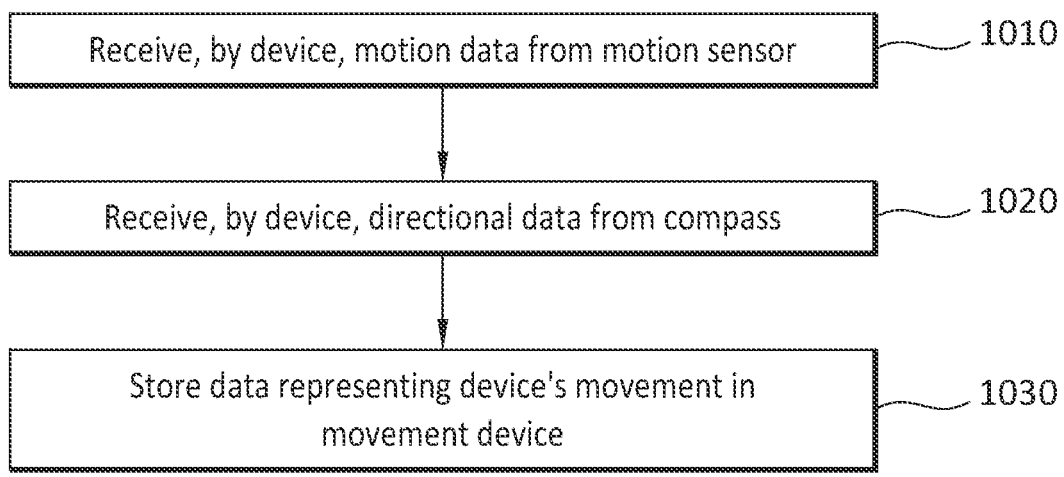
FIG. 10A is a flowchart of a method in accordance with an embodiment.

FIG. 10A is a flowchart of a method in accordance with an embodiment. At step 1010, a device receives motion data from a motion sensor.

At step 1020, the device receives directional data from a compass.

At step 1030, data representing the device's movement is stored in a movement database.

FIG. 10B shows a movement database in accordance with an embodiment. Movement database 835 includes two columns 1054 and 1056. Column 1054 holds a direction. Column 1056 holds a distance. Each row of database 835 includes a direction and a distance, representing a defined movement from one place to another.

In other embodiments, a movement database may be structured differently or may contain different types of information. For example, a movement database may include vectors defined by a direction, a speed, and a time.

Figure 10C:
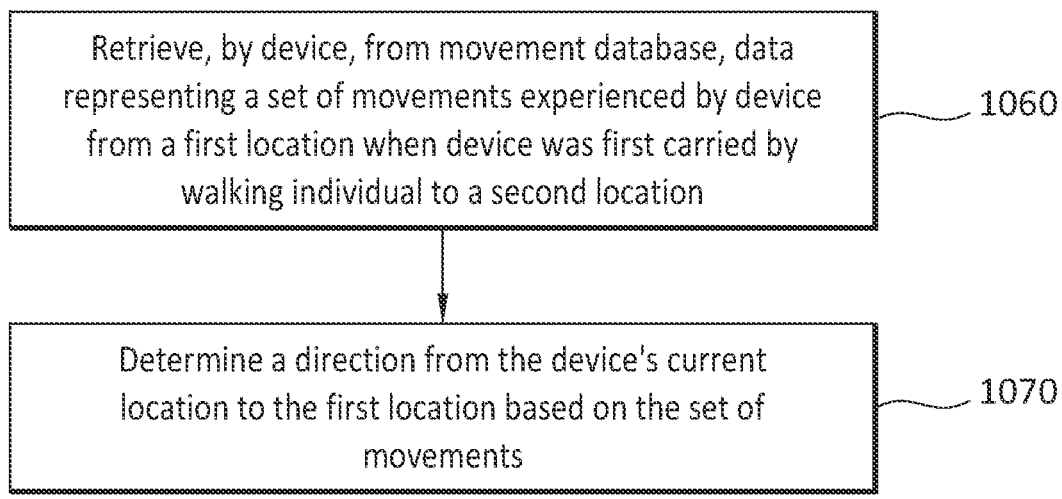
FIG. 10C is a flowchart of a method in accordance with an embodiment.

FIG. 10C is a flowchart of a method in accordance with an embodiment. At step 1060, a device retrieves data representing a set of movements experienced by a device from a first location when the device was first carried by a walking individual to a second location. For example, the data in a movement database 835 may be retrieved.

At step 1070, a direction from the device's current location to the first location is determined based on the set of movements. The movements defined by the data in movement database are analyzed and a direction from the last location of the device and the first location of the device is determined.

Many vehicles are sold with a smart key that includes functions such as an "unlock car" button and a "lock car" button. In accordance with another embodiment, some or all of the functionalities and features described herein are implemented in a smart key. For example, a vehicle manufacturer may include certain functions described herein in a smart key provided with a new vehicle.

Figure 11:
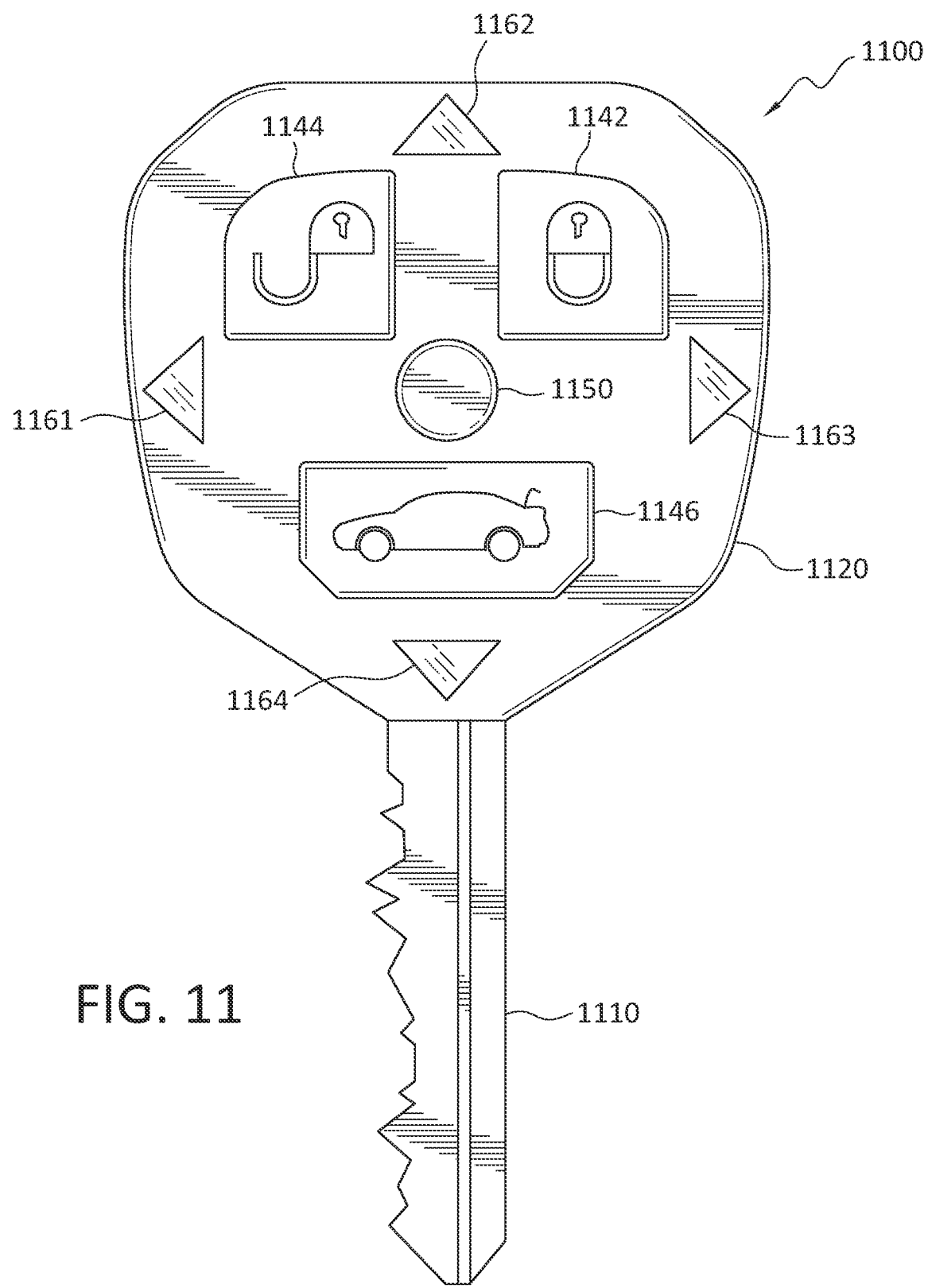
FIG. 11 shows a smart key in accordance with an embodiment.

FIG. 11 shows a smart key in accordance with an embodiment. Smart key 1100 includes a key portion 1110 and a body portion 1120. Body portion 1120 includes an unlock car button 1144, a lock car button 1142, and an unlock trunk button 1146. Body portion 1120 also includes a button 1150 and a plurality of directional indicators 1161, 1162, 1163, and 1164.

Figure 12:
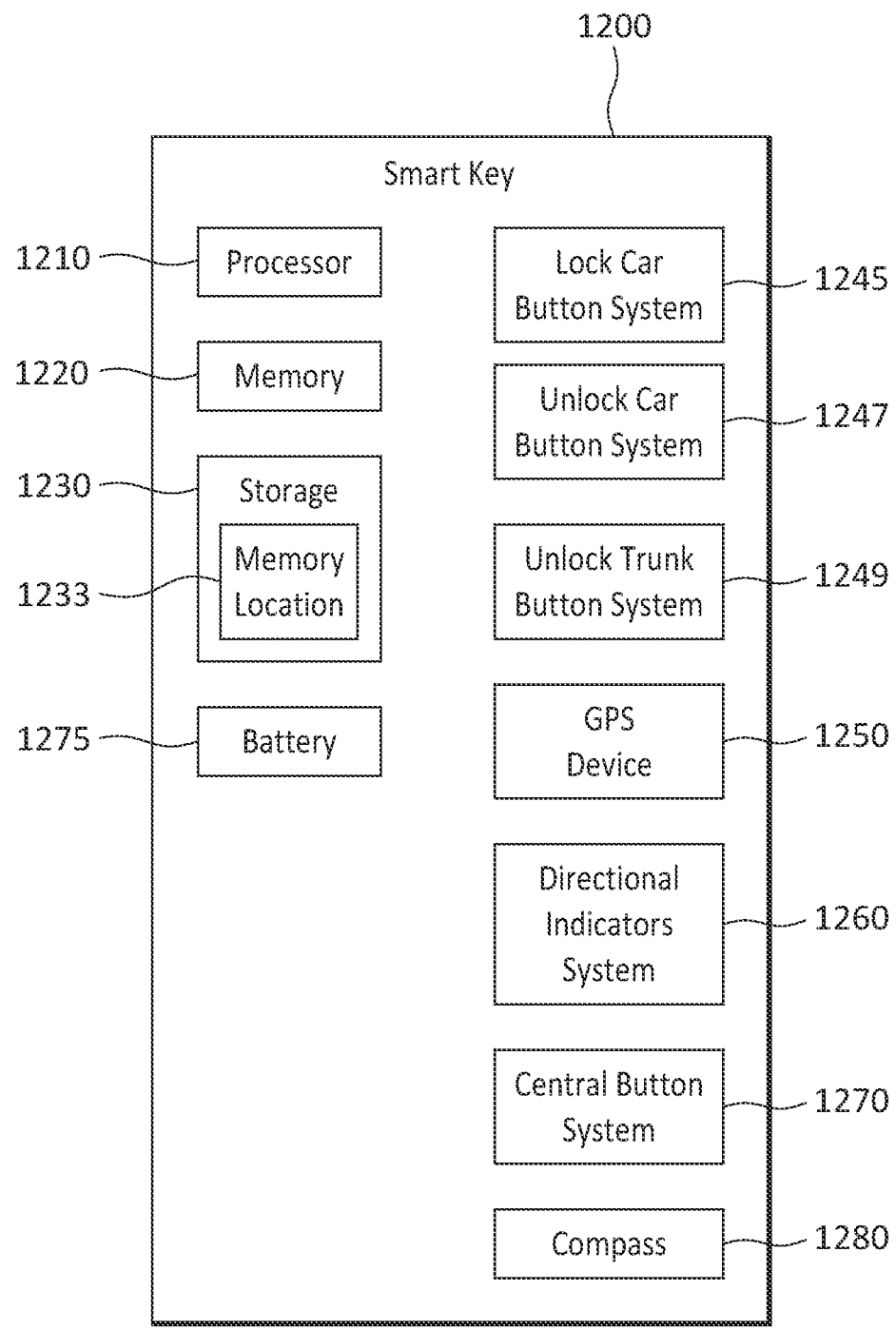
FIG. 12 shows components of a smart key in accordance with an embodiment.

FIG. 12 shows components of a smart key in accordance with an embodiment.

In accordance with an embodiment, when a selected button of smart key 1100 is pressed by a user, smart key 1100 determines its current location and stores the location information in a selected memory location. For example, smart key 1100 may perform this function when the lock car button is pressed, or when the lock trunk button or the unlock car button is pressed, or when another button is pressed.

Figure 13:
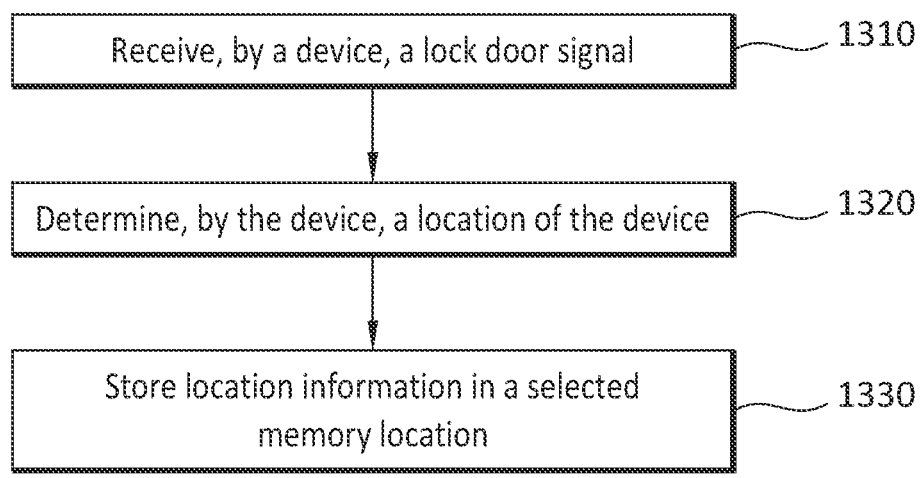
FIG. 13 shows a method in accordance with an embodiment.

FIG. 13 shows a method in accordance with an embodiment. At step 1310, a lock door signal is received by a device. For example, a user may park his or her vehicle in a parking lot near a store. The user exits the vehicle holding smart key 1100 and presses lock car button 1142. In response to the user's selection of the lock car button 1142, lock car button system 1245 transmits a lock door signal to processor 1210. Processor 1210 receives the lock door signal and causes one or more doors in the vehicle to lock.

At step 1320, a location of the device is determined by the device, in response to the lock door signal. In response to the lock door signal, processor 1210 also causes GPS device 1250 to determine a location of the device. GPS device 1250 thus generates location data and provides the location data to processor 1210.

At step 1330, location information is stored, by the device, in a selected memory location. Processor 1210 stores the location data in memory location 1233 (in storage 1230).

In the illustrative embodiment, the user now enters the store. At a subsequent time, the user may exit the store and press central button 1150 of smart key 1100. In response to the user's selection of button 1150, smart key 1100 performs a routine similar to that of FIG. 7B. Accordingly, smart key 1100 determines it current location, retrieves from memory location 1233 the location data representing the location of the vehicle, determines a direction from the current location to the location of the vehicle, and illuminates a selected directional indicator indicating the direction to the vehicle.

In various embodiments, the method steps described herein, including, without limitation, those of FIGS. 7A-7D, 9, 10A, 10C, and 13, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 15:
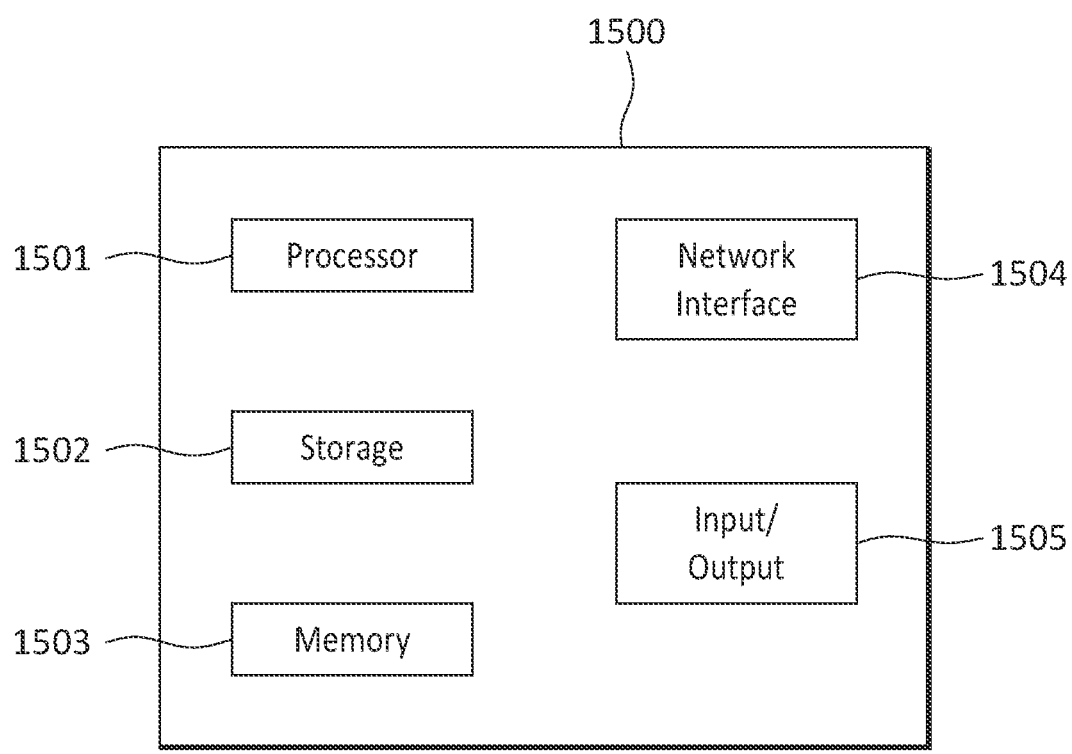
FIG. 15 shows components of a computer in accordance with an embodiment.

A high-level block diagram of an exemplary computer that may be used to implement systems, apparatus and methods described herein is illustrated in FIG. 15. Computer 1500 includes a processor 1501 operatively coupled to a data storage device 1502 and a memory 1503. Processor 1501 controls the overall operation of computer 1500 by executing computer program instructions that define such operations. The computer program instructions may be stored in data storage device 1502, or other computer readable medium, and loaded into memory 1503 when execution of the computer program instructions is desired. Thus, the method steps described herein, including, without limitation, the methods steps described in FIGS. 7A-7D, 9, 10A, 10C, and 13, can be defined by the computer program instructions stored in memory 1503 and/or data storage device 1502 and controlled by the processor 1501 executing the computer program instructions. For example, the computer program instructions can be implemented as computer executable code programmed by one skilled in the art to perform an algorithm defined by the method steps described herein. Accordingly, by executing the computer program instructions, the processor 1501 executes an algorithm defined by the method steps described herein. Computer 1500 also includes one or more network interfaces 1504 for communicating with other devices via a network. Computer 1500 also includes one or more input/output devices 1505 that enable user interaction with computer 1500 (e.g., display, keyboard, mouse, speakers, buttons, etc.).

Processor 1501 may include both general and special purpose microprocessors, and may be the sole processor or one of multiple processors of computer 1500. Processor 1501 may include one or more central processing units (CPUs), for example. Processor 1501, data storage device 1502, and/or memory 1503 may include, be supplemented by, or incorporated in, one or more application-specific integrated circuits (ASICs) and/or one or more field programmable gate arrays (FPGAs).

Data storage device 1502 and memory 1503 each include a tangible non-transitory computer readable storage medium. Data storage device 1502, and memory 1503, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1505 may include peripherals, such as a printer, scanner, display screen, smartphone, etc. For example, input/output devices 1505 may include a display device such as a cathode ray tube (CRT) or liquid crystal display (LCD) monitor for displaying information to the user, a keyboard, and a pointing device such as a mouse or a trackball by which the user can provide input to computer 1500.

Any or all of the systems and apparatus discussed herein, and components thereof, may be implemented using a computer such as computer 1500.

One skilled in the art will recognize that an implementation of an actual computer or computer system may have other structures and may contain other components as well, and that FIG. 15 is a high level representation of some of the components of such a computer for illustrative purposes.

In accordance with another embodiment, a locator device includes a plastic case, a membrane, and a plurality of lighting elements. The membrane is fully or partially waterproof. The lighting elements are disposed within the case under the membrane. The lighting elements are visible through the membrane.

The locator device is adapted to determine and store a first location of the device. The device is further adapted to determine, at a subsequent time, a second location of the device. The device is also adapted to determine a relative direction from the second location to the first location, select, from among a plurality of directional indicators, a directional indicator corresponding to the relative direction, and illuminate the selected directional indicator.

Figure 16A:
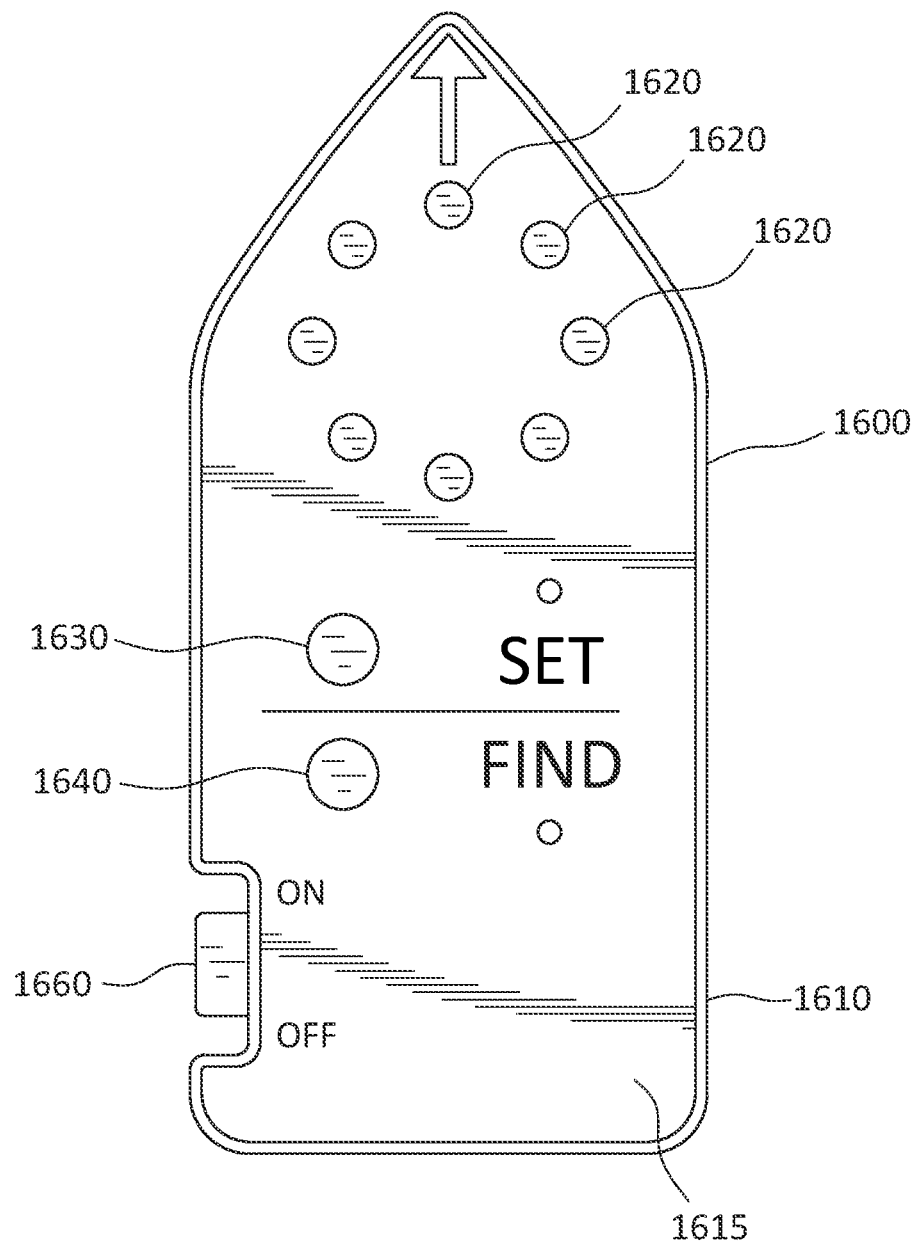
FIG. 16A shows a locator device in accordance with an embodiment.

FIG. 16A shows a locator device in accordance with an embodiment. Locator device 1600 includes a housing 1610 (alternatively referred to as a case) formed from a plastic material. For example, housing 1610 may be formed of a thermoplastic such as acrylonitrile butadiene styrene (ABS).

Locator device 1600 includes a membrane 1615 that covers a portion of the outer surface of the device. Membrane 1615 is transparent or translucent. Membrane 1615 may be formed of a polycarbonate resin thermoplastic (such as a Lexan sheet). Advantageously, membrane 1615 has a high impact resistance.

Housing 1610 forms a first portion of the external surface of device 1600. Membrane 1615 forms a second portion of the external surface of the device. In the illustrative embodiment, membrane 1615 forms the top surface of device 1600. Housing 1610 forms the bottom surface and sides of the device.

In one embodiment, one or more electronic elements and/or lighting elements may be underprinted on the underside (lower surface) of membrane 1615. In another embodiment, one or more electronic elements and/or lighting elements may be disposed within membrane 1615.

Locator device 1600 includes a plurality of directional indicators 1620. In the illustrative embodiment of FIG. 16, device 1600 includes eight directional indicators 1620 arranged in a circular pattern. Each lighting element includes a lighting element disposed within housing 1610, under membrane 1615. For example, each directional indicator 1620 may include a light-emitting diode (LED).

Locator device 1600 also includes a SET button 1630 and a FIND button 1640 disposed at respective positions indicated on membrane 1615. Each of SET button 1630 and FIND button 1640 includes a respective pressure sensor disposed within housing 1610 and in contact with membrane 1615. Each respective pressure sensor is adapted to detect when pressure is exerted at the respective location on the outer surface of membrane 1615. For example, when a user presses the location on membrane 1615 associated with SET button 1630, the corresponding pressure sensor detects the pressure exerted by the user. In one embodiment, each of SET button 1630 and FIND button 1640 also includes a respective lighting element, such as an LED, that is visible through membrane 1615 and is illuminated when the button is pressed.

A user may press SET button 1630 to cause locator device 1600 to determine its (first) location and store the location in memory. The user may, at a subsequent time, press FIND button 1640 to cause the device again to determine its (second) location, determine a relative direction from the second location to the first location, and illuminate a selected one of directional indicators 1620 to indicate to the user the direction from the device's current location to the stored (first) location.

In other embodiments, other types of selectors may be used in place of the SET button 1630 and FIND button 1640. For example, a switch having a SET position and a FIND position, a dial having a SET position and a FIND position, etc., may be used.

Locator device 1600 also includes an ON-OFF switch 1660 that may be used to turn the device's power on or off. For example, switch 1660 may include a Single Pole Single Throw (SPST) switch.

Figure 16B:
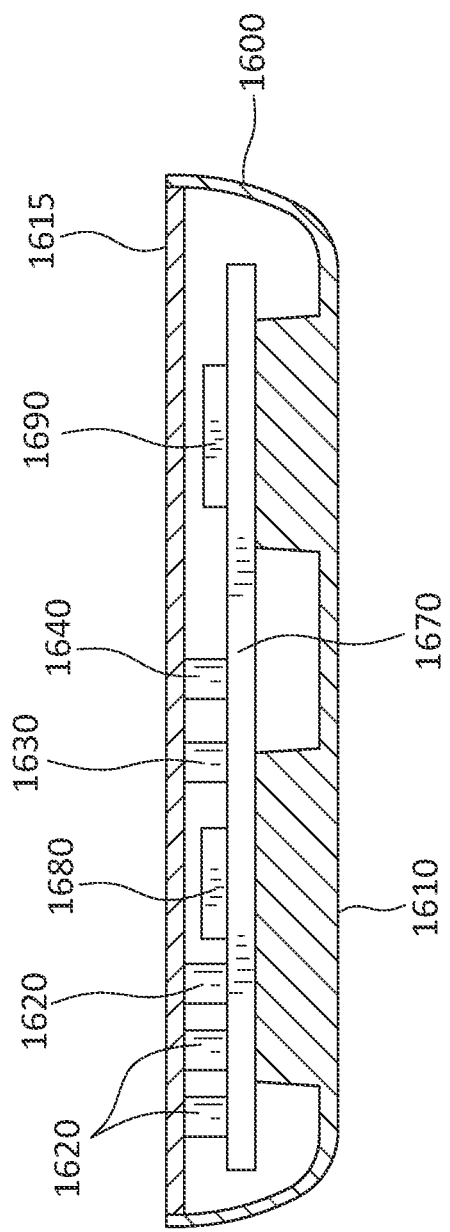
FIG. 16B shows a cross-sectional view of the locator device of FIG. 16A.

FIG. 16B shows a cross-sectional view of the locator device of FIG. 16A in accordance with an embodiment. Locator device 1600 includes a printed circuit board (PCB) 1670 that holds directional indicators 1620, SET button 1630 and FIND button 1640. Directional indicators 1620, SET button 1630 and FIND button 1640 are in contact with the lower surface of membrane 1615.

In one embodiment, one or more components of PCB 1670 are underprinted on the underside (inner surface) of membrane 1615. For example, directional indicators 1620, SET button 1630 and FIND button 1640 may be underprinted on the inner surface of membrane 1615. Other circuit elements may also be underprinted on the underside of membrane 1615. Alternatively, one or more components of PCB 1670, SET button 1630, and/or FIND button 1640, may be disposed within membrane 1615.

PCB 1670 also includes a microprocessor 1680 and a compass 1690. PCB 1670 may include other elements not shown in FIG. 16B.

It has been observed that when compass 1690 is situated in proximity to certain electronic elements of PCB 1670, electromagnetic effects generated by those electronic elements can interfere with the correct operation of compass 1690. In particular, the accuracy of compass 1690 may be affected by proximity to microprocessor 1680. Accordingly, in one embodiment, compass 1690 is located at least a predetermined distance from microprocessor 1680 in order to reduce or eliminate any electromagnetic effects compass 1690 may experience from microprocessor 1680. In one embodiment, compass 1690 is located at least 1.5 inches from microprocessor 1680.

Locator device 1600 also includes a power source, such as a battery (similar to battery 375 shown in FIG. 3). In one embodiment, the battery is a rechargeable battery. In another embodiment, the battery is a conventional (non-rechargeable) battery. Other power sources may be used, such as solar cells.

Thus, in accordance with an embodiment, a device includes a housing formed from acrylonitrile butadiene styrene, the housing forming a first portion of an external surface of the device, a membrane formed of a polycarbonate resin thermoplastic, the membrane forming a second portion of the external surface of the device, the membrane having an outer surface, the membrane being one of transparent and translucent, and a plurality of directional indicators each adapted to display a selected direction, wherein each of the plurality of directional indicators is disposed below the outer surface of the membrane and is in contact with the membrane, each directional indicator comprising a light-emitting diode (LED), wherein each of the plurality of directional indicators, when illuminated, is visible through the outer surface of the membrane. The device also includes a first button comprising a first pressure sensor adapted to detect when a user presses the first button, the first button being disposed below the outer surface of the membrane and in contact with the membrane, and a second button comprising a second pressure sensor adapted to detect when a user presses the second button, the first button being disposed below the outer surface of the membrane and in contact with the membrane. The device also includes a printed circuit board (PCB) that includes a memory adapted to store data, a GPS device adapted to generate information representing a location of the device, a compass adapted to generate direction information, and a processor adapted to: determine that the first button has been pressed, in response to determining that the first button has been pressed, obtain from the GPS device first location data representing a first location and store the first location data in the memory, determine that the second button has been pressed, in response to determining that the second button has been pressed, retrieve the first location data from the memory, obtain from the GPS device second location data representing a second location, determine a direction from the second location to the first location, based on direction information generated by the compass, identify one of the plurality of directional indicators that corresponds to the direction, and illuminate the identified directional indicator to indicate the direction. The membrane may have an inner surface, and the plurality of directional indicators may be underwritten on the inner surface of the membrane or disposed within the membrane.

In accordance with another embodiment, an apparatus includes a housing adapted to be carried in a hand of a user, a GPS device adapted to determine a location of the apparatus, a memory adapted to store data, a plurality of lighting elements disposed in a circular pattern in the housing and first and second buttons. The apparatus also includes a processor adapted to determine that the first button has been selected, and, in response to determining that the first button has been selected, perform operations including: causing the GPS device to determine a first location of the apparatus, and storing data representing the first position in the memory. The processor is also adapted to determine that the second button has been selected, and, in response to determining that the second button has been selected, perform operations including: retrieving from the memory the data representing the first location, causing the GPS device to determine a second position of the apparatus, determining a direction from the second location to the first location, identifying, from among the plurality of lighting elements, a lighting element that corresponds to the direction, and activating the identified lighting element.

In accordance with another embodiment, a system includes a first device adapted to determine a first location of the first device and transmit a signal including information representing the first location. The system also includes a second device that includes a receiver adapted to receive one or more signals, a memory comprising a selected memory location, a plurality of directional indicators, and a processor. The processor is adapted to receive the signal, determine the first location based on the signal, store information related to the first location in the selected memory location, determine a second location of the second device, determine a direction from the first device to the second device based on the first and second locations, and activate a selected directional indicator indicating the direction from the first device to the second device.

In other embodiments, a locator device similar to any one of the devices described herein may be used for other uses. For example, a person with a impaired cognitive abilities (for example, a patient with Alzheimer's) or an impaired directional ability associated with any other cause may use a locator device to find his or her way home or to a desired location. Alternatively, a person conducting an outdoors activity such as hiking, hunting, etc., may use a locator device such as that described herein to find his or her way back to a predetermined departure point, to a rendezvous point, etc.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A device comprising:
   a housing formed from acrylonitrile butadiene styrene, the housing forming a first portion of an external surface of the device;
   a membrane formed of a polycarbonate resin thermoplastic, the membrane forming a second portion of the external surface of the device, the membrane having an outer surface, the membrane being one of transparent and translucent;
   a plurality of directional indicators each adapted to display a selected direction, wherein each of the plurality of directional indicators is disposed below the outer surface of the membrane and is in contact with the membrane, each directional indicator comprising a light-emitting diode (LED), wherein each of the plurality of directional indicators, when illuminated, is visible through the outer surface of the membrane;
   a first button comprising a first pressure sensor adapted to detect when a user presses the first button, the first button being disposed below the outer surface of the membrane and in contact with the membrane;
   a second button comprising a second pressure sensor adapted to detect when a user presses the second button, the first button being disposed below the outer surface of the membrane and in contact with the membrane; and
   a printed circuit board (PCB) comprising:
      a memory adapted to store data;
      a GPS device adapted to generate information representing a location of the device;
      a compass adapted to generate direction information; and
      a processor adapted to:
         determine that the first button has been pressed;
         in response to determining that the first button has been pressed:
            obtain from the GPS device first location data representing a first location; and
            store the first location data in the memory;
         determine that the second button has been pressed;
         in response to determining that the second button has been pressed:
            retrieve the first location data from the memory;
            obtain from the GPS device second location data representing a second location;
            determine a direction from the second location to the first location, based on direction information generated by the compass;
            identify one of the plurality of directional indicators that corresponds to the direction; and
            illuminate the identified directional indicator to indicate the direction.

2. The device of claim 1, wherein:
   the membrane has an inner surface; and
   the plurality of directional indicators are one of: underwritten on the inner surface of the membrane and disposed within the membrane.

3. The device of claim 1, wherein the compass is disposed at least 1.5 inches from the processor.

4. An apparatus comprising:
   a housing adapted to be carried in a hand of a user;
   a GPS device adapted to determine a location of the apparatus;
   a memory adapted to store data;
   a plurality of lighting elements disposed in a circular pattern in the housing;
   first and second buttons disposed in the housing; and
   a processor adapted to:
      determine that the first button has been selected;
      in response to determining that the first button has been selected, perform operations including:
         causing the GPS device to determine a first location of the apparatus; and
         storing data representing the first position in the memory;
      determine that the second button has been selected; and
      in response to determining that the second button has been selected, perform operations including:
         retrieving from the memory the data representing the first location;
         causing the GPS device to determine a second position of the apparatus;
         determining a direction from the second location to the first location;
         identifying, from among the plurality of lighting elements, a lighting element that corresponds to the direction; and
         activating the identified lighting element.

5. The apparatus of claim 4, wherein the apparatus comprises eight lighting elements.

6. The apparatus of claim 4, further comprising:
   a compass adapted to generate direction information;
   wherein determining a direction from the second location to the first location includes obtaining direction information from the compass.

7. The apparatus of claim 4, wherein:
   the housing forms a first portion of an external surface of the apparatus;
   the housing is formed from acrylonitrile butadiene styrene;
   the apparatus further comprises membrane forming a second portion of the external surface of the device;
   the membrane formed of a polycarbonate resin thermoplastic;
   the plurality of lighting elements are disposed within the housing and are visible through the membrane; and
   the first and second buttons are disposed within the housing and in contact with the membrane.

8. The apparatus of claim 7, wherein:
   the first and second buttons comprises respective pressure sensors adapted to be activated by pressure exerted on an outer surface of the membrane.

* * * * *